United States Patent
Saito et al.

(10) Patent No.: US 10,218,429 B2
(45) Date of Patent: Feb. 26, 2019

(54) INFORMATION PROCESSING DEVICE AND INFORMATION PROCESSING METHOD FOR RELAYING SIGNAL

(71) Applicant: SONY CORPORATION, Tokyo (JP)

(72) Inventors: Erika Saito, Tokyo (JP); Kazuyuki Sakoda, Chiba (JP); Natsuki Itaya, Tokyo (JP); Kenzoh Nishikawa, Kanagawa (JP); Chihiro Fujita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/519,142

(22) PCT Filed: Sep. 16, 2015

(86) PCT No.: PCT/JP2015/004725
§ 371 (c)(1),
(2) Date: Apr. 13, 2017

(87) PCT Pub. No.: WO2016/063454
PCT Pub. Date: Apr. 28, 2016

(65) Prior Publication Data
US 2017/0244472 A1    Aug. 24, 2017

(30) Foreign Application Priority Data
Oct. 21, 2014   (JP) ................................ 2014-214859

(51) Int. Cl.
*H04W 4/02*      (2018.01)
*H04B 7/155*     (2006.01)
(Continued)

(52) U.S. Cl.
CPC ........ *H04B 7/15507* (2013.01); *H04B 7/155* (2013.01); *H04B 17/318* (2015.01);
(Continued)

(58) Field of Classification Search
CPC ... H04B 7/15507; H04B 17/318; H04W 4/02; H04W 84/18
See application file for complete search history.

(56) References Cited

U.S. PATENT DOCUMENTS
9,107,081 B1 * 8/2015 Pezeshkian ........ H04B 7/15507

FOREIGN PATENT DOCUMENTS
FR      2961371 A1     12/2011
JP    2005-236807 A     9/2005
(Continued)

OTHER PUBLICATIONS

Office Action for JP Patent Application No. 2014214859, dated Oct. 31, 2017, 05 pages of Office Action and 05 pages of English Translation.
(Continued)

*Primary Examiner* — Thai Nguyen
(74) *Attorney, Agent, or Firm* — Chip Law Group

(57) ABSTRACT

An information processing device that includes circuitry that: receives a signal from a first device; measures a signal strength of the signal received from the first device; determines whether the signal strength is less than a threshold; and in a case that the signal strength is determined to be less than the predetermined threshold, transmits to an second device an instruction signal such that, in response to the instruction signal, the second device moves to a position to relay the signal from the first device to the information processing device.

20 Claims, 22 Drawing Sheets

(51) Int. Cl.
*H04B 17/318* (2015.01)
*H04W 4/80* (2018.01)
*H04W 84/18* (2009.01)

(52) U.S. Cl.
CPC ............... *H04W 4/02* (2013.01); *H04W 4/80* (2018.02); *H04W 84/18* (2013.01)

(56) References Cited

FOREIGN PATENT DOCUMENTS

| | | | |
|---|---|---|---|
| JP | 2009-239385 A | 10/2009 | |
| JP | 2012-054735 A | 3/2012 | |
| WO | 2011/018892 A1 | 2/2011 | |
| WO | 2012/037637 A1 | 3/2012 | |
| WO | 2014/162199 A1 | 10/2014 | |
| WO | WO 2015147715 A1 * | 10/2015 | ............ H04W 24/02 |

OTHER PUBLICATIONS

Office Action for EP Patent Application No. 15779033.8, dated May 28, 2018, 4 pages of Office Action.

\* cited by examiner

FIG. 3

| | | 160 |
|---|---|---|
| 161 | IDENTIFICATION INFORMATION | 0001 |
| 162 | FUNCTION INFORMATION | RADIO COMMUNICATION FUNCTION |
| | | ... |
| 163 | NOTIFICATION INTERVAL | ONE SECOND |
| 164 | CAPABILITY | KEYBOARD |
| | | 4k TV |
| | | SPEAKER |
| | | MICROPHONE |
| | | ... |
| 165 | KEY INFORMATION | ... |

FIG. 5

| | | | | |
|---|---|---|---|---|
| POSITIONAL INFORMATION (271) | LIVING ROOM | | | |
| FUNCTION INFORMATION (272) | RADIO COMMUNICATION FUNCTION | | | |
| | DISPLAY FUNCTION | | | |
| | ... | | | |
| EVENT TYPE (273) | IB001 | IB002 | IB003 | ... |
| NOTIFICATION DESTINATION (274) | OUTPUT APPARATUS | POWER APPARATUS | ... | ... |
| | ... | ... | ... | ... |
| PROCESSING CONTENT (275) | TV PROGRAM VIEWING | UNLOCK/LOCK | ... | ... |

270

INFORMATION PROCESSING DEVICE AND INFORMATION PROCESSING METHOD FOR RELAYING SIGNAL

CROSS REFERENCE TO RELATED APPLICATIONS

This application is a U.S. National Phase of International Patent Application No. PCT/JP2015/004725 filed on Sep. 16, 2015, which claims priority benefit of Japanese Patent Application JP 2014-214859 filed in the Japan Patent Office on Oct. 21, 2014. Each of the above-referenced applications is hereby incorporated herein by reference in its entirety.

TECHNICAL FIELD

The present technology relates to an information processing apparatus. Described in more detail, the present technology relates to an information processing apparatus, a communication system, and an information processing method handling information that is transmitted/received through radio communication, and a program causing a computer to execute the method.

BACKGROUND ART

In related art, there are radio communication technologies for exchanging information through radio communication. For example, a communication method (for example, ad hoc communication or an ad hoc network) autonomously making a connection with an information processing apparatus within the range of arrival of an electric wave has been proposed (for example, see Patent Literature 1).

CITATION LIST

Patent Literature

[PTL 1]
JP 2009-239385 A

SUMMARY

The present disclosure provides an information processing device that includes circuitry that: receives a signal from a first device; measures a signal strength of the signal received from the first device; determines whether the signal strength is less than a threshold; and in a case that the signal strength is determined to be less than the predetermined threshold, transmits to an second device an instruction signal such that, in response to the instruction signal, the second device moves to a position to relay the signal from the first device to the information processing device.

BRIEF DESCRIPTION OF DRAWINGS

FIG. 3 is a diagram that schematically illustrates an example of a management content of a notification information management table 160 stored in a storage unit 140 according to an embodiment of the present technology.

FIG. 5 is a diagram that schematically illustrates an example of a management content of a process management table 270 stored in a storage unit 240 according to an embodiment of the present technology.

DESCRIPTION OF EMBODIMENTS

Technical Problem

Figure 1:
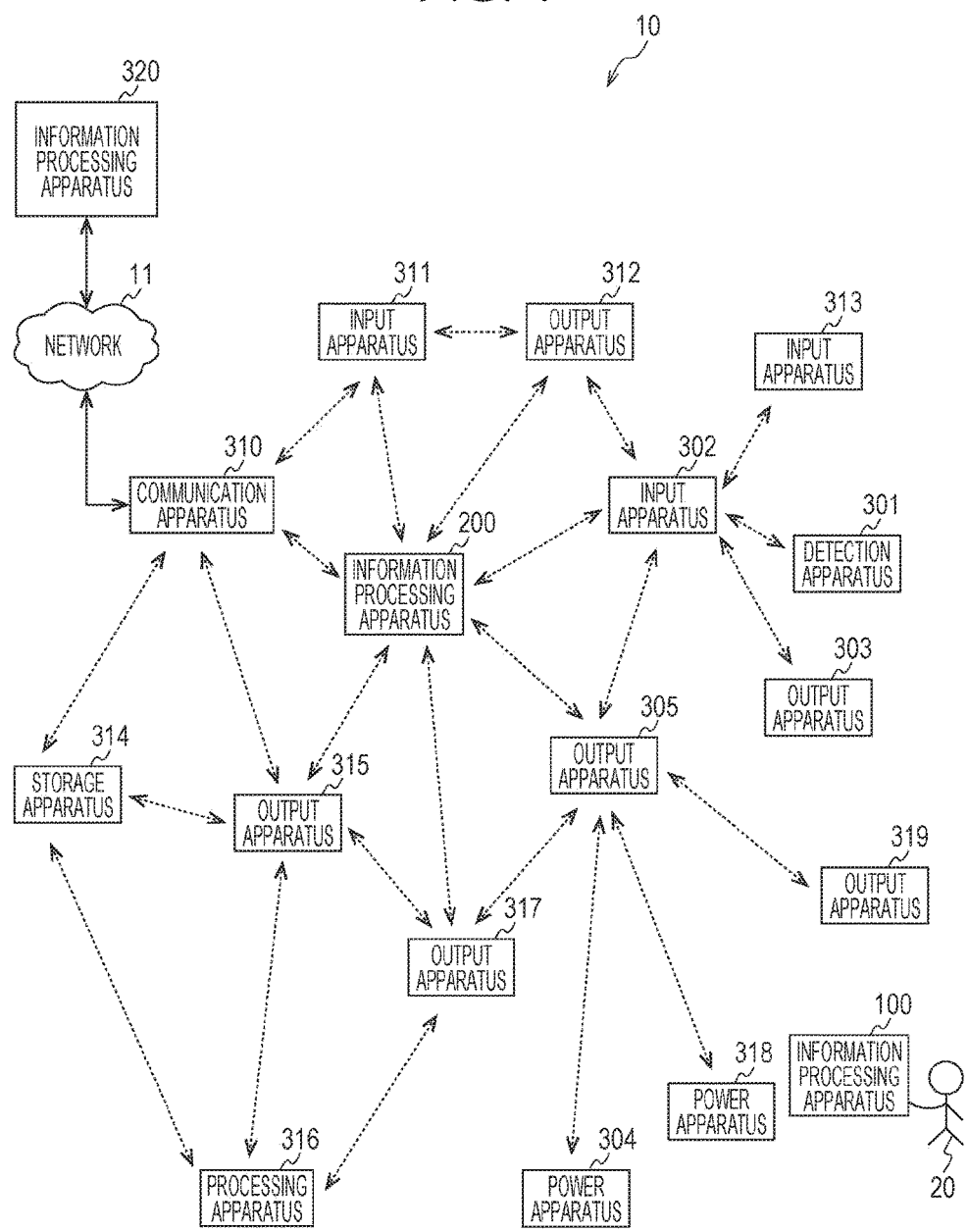
FIG. 1 is a diagram that illustrates an example of the system configuration of a communication system 10 according to a first embodiment of the present technology.

According to the technology in related art described above, information can be exchanged between two information processing apparatuses by using radio communication without a connection using wired lines.

Thus, for example, by using the information exchanged between the information processing apparatuses, an environment according to a user can be provided.

The present technology is in consideration of such situations, and it is desirable to provide an environment according to a user.

Solution to Problem

The present technology is for solving the above-described problems, and, according to a first aspect, there are provided an information processing apparatus including a control unit that determines an apparatus to execute a predetermined process from among a plurality of apparatuses based on functions of apparatuses configuring the plurality of apparatuses and positions at which the apparatuses are present in a network through which the plurality of apparatuses are interconnected, an information processing method thereof, and a program causing a computer to execute the method. Accordingly, an effect of determining an apparatus to execute a predetermined process based on functions of the apparatuses and positions at which the apparatuses are present is acquired.

In addition, in the first aspect, the control unit may determine the apparatus to execute the predetermined process based on a position at which a user apparatus possessed by a user is detected from among the plurality of apparatuses. In such a case, an effect of determining an apparatus to execute a predetermined process based on the position at which the user apparatus is detected is acquired.

In addition, in the first aspect, the control unit may determine a content of the predetermined process and the apparatus to execute the predetermined process based on input information input by a user. In such a case, an effect of determining a content of the predetermined process and the apparatus to execute the predetermined process based on input information input by the user is acquired.

In addition, in the first aspect, the control unit may execute control for causing the determined apparatus to execute the predetermined process. In such a case, an effect of causing the determined apparatus to execute the predetermined process is acquired.

In addition, in the first aspect, the control unit may acquire information acquired by the apparatus through radio communication, analyze the acquired information, and determine the apparatus to execute the predetermined process based on a result of the analysis. In such a case, an effect of analyzing the information acquired through radio communication and determining the apparatus to execute the predetermined process based on a result of the analysis is acquired.

In addition, in the first aspect, the apparatus may maintain management information managing a function included in the apparatus, a position at which the apparatus is present and the content of the predetermined process, and the control unit may transmit update information used for updating the management information based on the result of the analysis to the apparatus. In such a case, an effect of transmitting update information used for updating the management information based on the result of the analysis is acquired.

In addition, in the first aspect, the network may be a network through which the plurality of apparatuses are interconnected as the plurality of apparatuses execute one-to-one radio communication. In such a case, an effect of determining the apparatus in the network through which the plurality of apparatuses are interconnected as the plurality of apparatuses execute one-to-one radio communication is acquired.

In addition, according to a second aspect of the present technology, there are provided an information processing apparatus including a control unit that determines a position of a third apparatus used as a repeater for communication between a first apparatus and a second apparatus based on a relative positional relation between the first apparatus and the second apparatus configuring a plurality of apparatuses in a network through which the plurality of apparatuses are interconnected as the plurality of apparatuses execute one-to-one radio communication, an information processing method thereof, and a program causing a computer to execute the method. Accordingly, an effect of determining a position of a third apparatus used as a repeater for communication between a first apparatus and a second apparatus based on a relative positional relation between the first apparatus and the second apparatus is acquired.

Further, in the second aspect, the control unit may execute control for moving the third apparatus up to the determined position. In such a case, an effect of moving the third apparatus up to the determined position is acquired.

Further, in the second aspect, the third apparatus may be an apparatus that is movable in the air, and the control unit may move the third apparatus up to the determined position through the air. In such a case, an effect of moving the third apparatus up to the determined position through the air is acquired.

Further, in the second aspect, the control unit may determine the position of the third apparatus at timing before a distance between the first and second apparatuses becomes a distance at which the first apparatus and the second apparatus are not directly communicable with each other. In such a case, an effect of determining the position of the third apparatus at timing before a distance between the first and second apparatuses becomes a distance at which the first apparatus and the second apparatus are not directly communicable with each other is acquired.

In addition, according to a third aspect of the present technology, there are provided a communication system including: a detection apparatus that detects a user apparatus possessed by a user; an input apparatus that inputs information relating to the user; and an information processing apparatus that determines an apparatus to execute a predetermined process for the user from among a plurality of apparatuses based on functions of apparatuses configuring the plurality of apparatuses, a position at which the user apparatus is detected, and the input information in a network through which the plurality of apparatuses including the detection apparatus and the input apparatus are interconnected, an information processing method thereof, and a program causing a computer to execute the method. Accordingly, an effect of determining an apparatus to execute a predetermined process based on functions of the apparatuses, a position at which the user apparatus is detected, and the input information is acquired.

Advantageous Effects

According to an embodiment of the present technology, a superior advantage of providing an environment according to a user can be acquired. The advantages described here are not necessarily limited, and any one of the advantages described in the present disclosure may be achieved.

EMBODIMENTS

Hereinafter, embodiments of the present technology (hereinafter, referred to as embodiments) will be described. Description will be presented in the following order.
1. First Embodiment (Example in Which Apparatus of High-Level Function Is Realized by Using Functions of Plurality of Apparatuses Arranged in Distributed Manner in Combined and Cooperative Manner as Whole Communication System)
2. Second Embodiment (Example in Which Area of Network Configured by Plurality of Apparatuses Is Expanded)
3. Application Example 1. First Embodiment

[Configuration Example of Communication System]

FIG. 1 is a diagram that illustrates an example of the system configuration of a communication system 10 according to a first embodiment of the present technology.

The communication system 10 includes: a network 11; and information processing apparatuses 100, 200, and 320. In addition, the communication system 10 includes: a detection apparatus 301; a communication apparatus 310, input apparatuses 302, 311, and 313; output apparatuses 303, 305, 312, 315, 317, and 319; a storage apparatus 314; a processing apparatus 316; and power apparatuses 304 and 318.

Each of the apparatuses other than the network 11 and the information processing apparatus 320 has a radio communication function for exchanging information with the other apparatuses by using radio communication.

For example, each of the apparatuses other than the network 11 and the information processing apparatus 320 can execute radio communication according to a communication system of a wireless local area network (LAN). Each of the apparatuses other than the network 11 and the information processing apparatus 320 may be configured to execute radio communication according to any other communication system.

As above, by arranging various radio communication apparatuses in a distributed manner inside a predetermined area, the communication system 10 is configured. Here, the information processing apparatus 100 is assumed to be held by a user 20. In addition, the information processing apparatus 100 has a function of transmitting a signal (notification information) that represents the existence of the apparatus.

Here, the predetermined area, for example, represents a place such as an office, a house (including a yard), a factory, an airport, an educational facility (school), a cultural facility, a sports facility, a welfare facility, a medical facility, a meeting place, an airport, a tourist facility, a commercial facility, or an accommodation facility.

In such an area, a plurality of various electronic apparatuses are arranged. For example, electronic apparatuses such as sensors, a television set, a projector, a hard disk recorder, a speaker, a microphone, an access point, a personal computer (PC), and a display are arranged. In addition, for example, electronic apparatuses such as a gaming machine, a Blu-ray player, a printer, a sensor-attached light, an automatic door, a security apparatus, and a disaster prevention apparatus are arranged. Furthermore, for example, electronic apparatuses such as a tablet, a smartphone, a photo frame, a refrigerator, an air conditioner, and an air cleaner, a vacuum cleaner (for example, a mobile cleaner), a washer, a microwave oven, a toaster, a ventilation fan, and a radio are arranged. Such an electronic apparatus may have a radio communication function capable of exchanging information with other apparatuses by using radio communication.

In FIG. 1, each communication path of radio communication that is made between apparatuses is denoted by a linear dotted line. In addition, the radio communication made between apparatuses, for example, is realized by using a communication method for autonomous mutual connections with peripheral electronic apparatuses. Here, the peripheral electronic apparatuses, for example, are approaching electronic apparatuses and adjacent electronic apparatuses.

Here, as communication methods for autonomous mutual connections with peripheral electronic apparatuses, ad hoc communication, an ad hoc network, and the like are known. In such a network, each electronic apparatus can communicate with a peripheral electronic apparatus without depending on a master station (for example, a control apparatus). Thus, in the first embodiment of the present technology, as the communication method for autonomous connections with peripheral electronic apparatuses, an ad hoc network or a mesh network will be described as an example.

In an ad hoc network, when a new electronic apparatus is added to the periphery, this new electronic apparatus can freely participate in the network. As above, in accordance with an increase in the number of electronic apparatuses (peripheral electronic apparatuses), the covered range of the network can be increased. In other words, in accordance with sequential addition of an electronic apparatus, the covered range of the network can be increased.

Here, each of the apparatuses other than the network 11 and the information processing apparatus 320 may transmit information to be exchanged with the other apparatuses in a bucket brigade manner instead of being autonomously connected to the other apparatuses present on the periphery.

For example, a case will be considered in which an apparatus (for example, the output apparatus 319) that is not directly communicable with the information processing apparatus 200 due to a reason such as no arrival of electric waves is present. Also in a case where direct communication is not executable as above, the output apparatus 305 that is directly communicable with the information processing apparatus 200 can transmit data of the information processing apparatus 200 to the output apparatus 319. Thus, by transmitting the data as above, the information processing apparatus 200 and the output apparatus 319 that is not directly communicable with the information processing apparatus 200 can exchange mutual information through the output apparatus 305. In other words, the information processing apparatus 200 and the output apparatus 319 can communicate with each other through a relay station (output apparatus 305).

The method of transmitting information to a remote apparatus by executing data transmission (so-called a bucket brigade) as above is called a multi-hop relay. In addition, a network executing the multi hopping is generally known as a mesh network. In addition, the communication system 10 is an example of a network in which a plurality of apparatuses are connected with each other as the plurality of apparatuses execute one-to-one radio communication.

In FIG. 1, the apparatuses configuring the communication system 10 are illustrated to be functionally classified into the following six types (1) to (6) of apparatuses based on the functions.
(1) Function for giving notification of presence of apparatus
(2) Detection function
(3) Input function
(4) Output function (Power function)
(5) Processing function
(6) Storage function The communication system 10 is configured by combining two or more types among such six types in an integral manner. However, the combination method is not limited thereto.

As above, the communication system 10 is a system in which radio communication apparatuses having various functions such as input/output, power, processing, and detection functions configure an ad hoc network or a mesh network.

[Configuration Example of Information Processing Apparatus]

Figure 2:
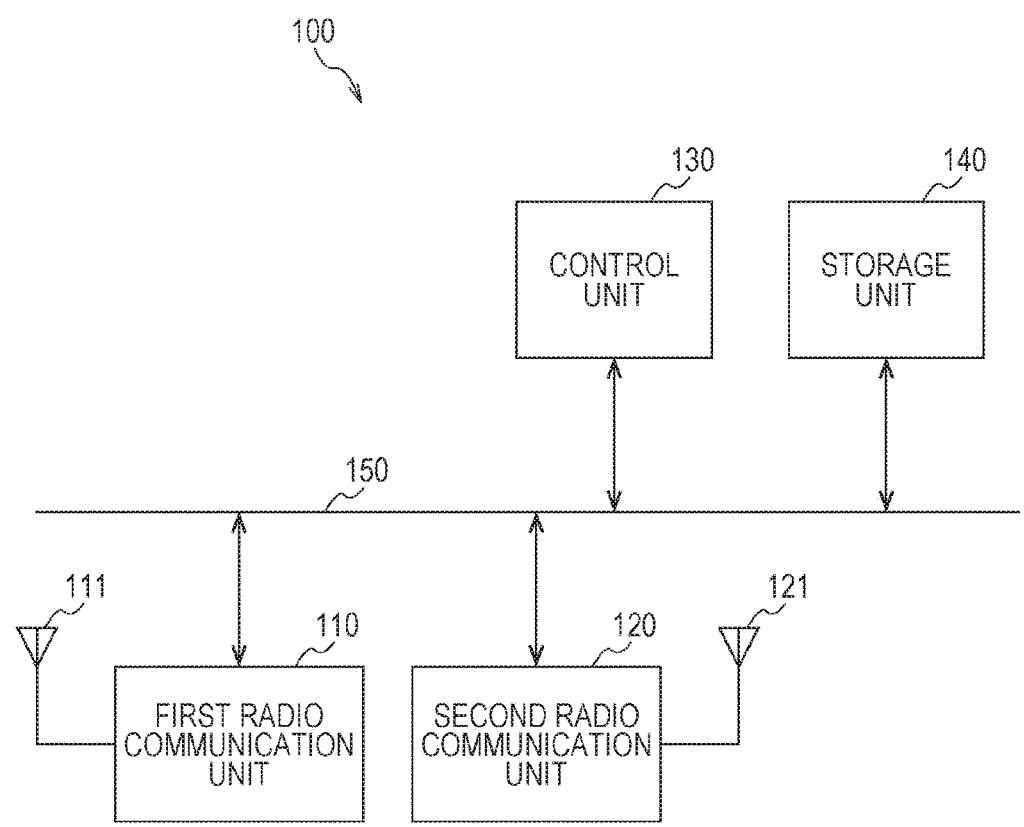
FIG. 2 is a block diagram that illustrates an example of the functional configuration of an information processing apparatus 100 according to the first embodiment of the present technology.

FIG. 2 is a block diagram that illustrates an example of the functional configuration of the information processing apparatus 100 according to the first embodiment of the present technology.

The information processing apparatus 100 includes: a first radio communication unit 110; a second radio communication unit 120; a control unit 130; and a storage unit 140. Such units are interconnected through a bus 150. The information processing apparatus 100, for example, is a mobile information processing apparatus (for example, a smartphone, a tablet terminal, or a mobile phone) that can be held by a user 20.

The first radio communication unit 110 is a module (for example, wireless local area network (LAN) modem) used for transmitting/receiving electric waves through an antenna 111. For example, the first radio communication unit 110 can execute radio communication by using a communication system of the wireless LAN.

For example, the first radio communication unit 110, under the control of the control unit 130, is connected to another apparatus and can exchange information with the apparatus using radio communication. In addition, for example, the first radio communication unit 110 can transmit information through another apparatus (first apparatus) to a further another apparatus (second apparatus) other than the another apparatus (first apparatus) under the control of the control unit 130.

The second radio communication unit 120 is a module (for example, a modem of a network other than the wireless LAN) used for transmitting/receiving electric waves through an antenna 121.

For example, the second radio communication unit 120 can communicate with other apparatuses that are present physically near through radio communication.

For example, the second radio communication unit 120 can execute radio communication according to zigbee, near field communication (NFC), Bluetooth (BT) (registered trademark), or Bluetooth low energy (BLE). In addition, for example, the second radio communication unit 120 may execute radio communication according to any other communication system (for example, visible light communication).

For example, the second radio communication unit 120, under the control of the control unit 130, is connected to another apparatus and can exchange information with the apparatus using radio communication. In addition, for example, the second radio communication unit 120 can transmit information through another apparatus (first apparatus) to a further another apparatus (second apparatus) other than the another apparatus (first apparatus) under the control of the control unit 130.

In addition, the first radio communication unit 110 and the second radio communication unit 120 may execute radio communication using electric waves (electromagnetic waves) or radio communication (for example, radio communication executed using a magnetic field) using a medium other than electric waves.

Furthermore, the first radio communication unit 110 and the second radio communication unit 120 may be configured as mutually-different devices, or the first radio communication unit 110 and the second radio communication unit 120 may be configured as same physical devices.

In addition, while an example, in which the information processing apparatus 100 includes the first radio communication unit 110 and the second radio communication unit 120, is illustrated in FIG. 2, any one thereof may be arranged in the information processing apparatus 100.

The storage unit 140 is a memory that stores various kinds of information. For example, various kinds of information (for example, a control program) that is necessary for the information processing apparatus 100 to execute a desired operation is stored in the storage unit 140. In addition, in the storage unit 140, for example, the notification information management table 160 illustrated in FIG. 3 is stored.

The control unit 130 controls each unit of the information processing apparatus 100 based on the control program stored in the storage unit 140. For example, the control unit 130 executes signal processing of transmitted/received information. The control unit 130 is realized by a central processing unit (CPU).

For example, a case will be considered in which data is transmitted by the first radio communication unit 110 by using radio communication. In such a case, the control unit 130 processes information read from the storage unit 140, a signal input from the input/output (I/O) interface (not illustrated in the figure), or the like and generates a block (transmission packet) of data that is actually transmitted. Subsequently, the control unit 130 outputs the generated transmission packet to the first radio communication unit 110. In addition, the first radio communication unit 110 converts the transmission packet into a format or the like of a communication system that is actually used for the transmission and then transmits the transmission packet after the conversion from the antenna 111 to the outside.

In addition, in a case where data is received by the first radio communication unit 110 by using the radio communication, the first radio communication unit 110 extracts a reception packet by signal processing of an electric wave signal, which is received through the antenna 111, that is executed by a receiver arranged inside the first radio communication unit 110. Then, the control unit 130 analyzes the extracted reception packet. As a result of this analysis, in a case where data is determined to be maintained, the control unit 130 writes the data in the storage unit 140. On the other hand, in a case where the data is determined to be transmitted to another apparatus, the control unit 130 outputs the data to the first radio communication unit 110 as a transmission packet to be transmitted to another apparatus. In addition, in a case where the data is determined to be output, the control unit 130 outputs the data to a display unit (not illustrated in the figure) or outputs the data from the I/O interface (not illustrated in the figure) to the outside (for example, an audio output unit).

Here, while the information processing apparatus 100 needs to have a simple function for a notification of a place at which the user 20 is present, the other functions may be omitted. For this reason, for example, as the information processing apparatus 100, other than the mobile information processing apparatus (for example, a smartphone, a tablet terminal, or a mobile phone), a simple apparatus having only a communication function for transmitting notification information (information illustrated in FIG. 3) may be used. For example, an apparatus (for example, an apparatus capable of executing radio communication using the BLE) capable of executing near field radio communication with extremely low power may be used. In such a case, for example, the apparatus may be built in an object (for example, a ring, a watch, or a necklace) worn by the user 20. Then, the apparatus is configured to transmit information (notification information) used for a notification of the presence of the apparatus on the periphery regularly, intermittently, or irregularly.

In addition, as illustrated in FIG. 2, in a case where the information processing apparatus 100 corresponds to a plurality of radio communication systems (the first radio communication unit 110 and the second radio communication unit 120), when the notification information is transmitted, it is preferable that the transmission process according to a radio communication system operable at low power is executed. For example, in a case where the first radio communication unit 110 executes radio communication according to the communication system of the wireless LAN, and the second radio communication unit 120 executes radio communication according to a radio communication system (for example, the BLE) other than the radio communication of the wireless LAN, the notification information is preferably transmitted by the second radio communication unit 120. However, the notification information may be configured to be transmitted by the first radio communication unit 110, or the notification information may be configured to be transmitted with switching between the first radio communication unit 110 and the second radio communication unit 120 being made regularly or irregularly. In addition, in a case where the notification information is transmitted with being included in a beacon, the notification information may be configured to be transmitted with being included in all the beacons, or the notification information may be transmitted with being included in beacons at a regular or irregular interval.

[Example of Content of Notification Information Management Table]

FIG. 3 is a diagram that schematically illustrates an example of a management content of the notification information management table 160 stored in the storage unit 140 according to an embodiment of the present technology.

The notification information management table 160 is a table used for managing information (notification information) notified to another apparatus by the information processing apparatus 100.

In the notification information management table 160, identification information 161, function information 162, a notification interval 163, a capability 164, and key information 165 are stored in association with each other.

The identification information 161 is identification information (individual identification ID (identification)) used for identifying the information processing apparatus 100. As the identification information, for example, apparatus-specific identification information (for example, a terminal ID or a media access control (MAC) address) or information representing the type of apparatus may be used. In addition, for example, a combination of a MAC address and an ID set by the user may be used. Furthermore, for example, user identification information used for identifying a user possessing the information processing apparatus 100 may be used.

The function information 162 is information relating to the function included in the information processing apparatus 100. For example, in a case where a display unit (for example, a display panel such as an electro luminescence (EL) panel or a liquid crystal display (LCD) panel) is included, an indication representing the inclusion of a display function is stored. In addition, for example, in a case where a print unit (for example, a printer) is included, an indication representing a printing function is stored. Furthermore, for example, in a case where an input unit (for example, a user interface such as a touch panel, a keyboard, a mouse, or a sensor) is included, an indication representing the inclusion of an input function is stored. For example, inclusion/no-inclusion of a function is configured as a flag, and the function information may be managed by using the flagged information ("1" in a case where the function is included, and "0" in a case where the function is not included).

The notification interval 163 is a transmission interval of the notification information. For example, in a case where the notification information is regularly transmitted, the interval thereof (for example, five seconds) is stored. On the other hand, in a case where the notification information is irregularly transmitted, the transmission timing (for example, in a case where a movement distance exceeds a threshold) is stored.

The capability 164 represents a service to which the information processing apparatus 100 corresponds or a service desired by the user possessing the information processing apparatus 100. For example, in a case where a user possessing the information processing apparatus 100 desires to view television, an indication (for example, starting up a television set) representing the desire to view television is stored. In addition, for example, in a case where a user possessing the information processing apparatus 100 desires to view a recorded television program, an indication (for example, starting up a television set and a recorder) representing the desire to view the television program is stored.

The key information 165 is information relating to a key used in a case where a specific apparatus is used. The specific apparatus, for example, is an apparatus that can be used only by a specific user and, for example, has a security function and is an apparatus that can be used only by a user having specific key information. The specific apparatus, for example, is a pairing partner apparatus.

Here, in a case where the information processing apparatus 100 transmits the notification information to another apparatus, at least the identification information 161 and the function information 162 among the information included in the notification information management table 160 are included for the transmission. The other information may be omitted.

[Configuration Example of Information Processing Apparatus]

Figure 4:
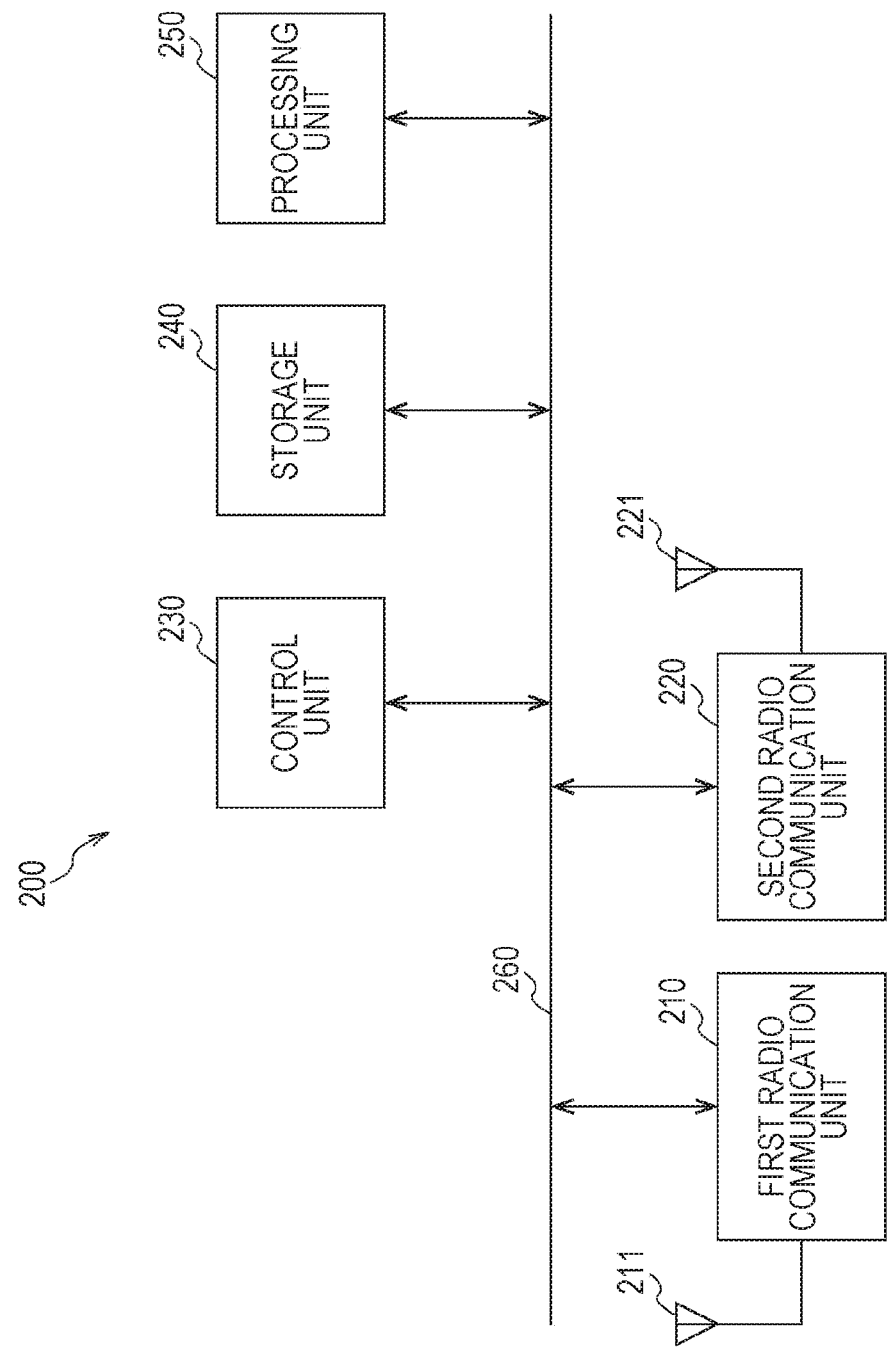
FIG. 4 is a block diagram that illustrates an example of the internal configuration of the information processing apparatus 200 according to the first embodiment of the present technology.

FIG. 4 is a block diagram that illustrates an example of the internal configuration of the information processing apparatus 200 according to the first embodiment of the present technology. The internal configuration of each of the other apparatuses (the detection apparatuses 301, 317, and 318 and the communication apparatus 310, the input apparatuses 302, 311, and 313, the output apparatuses 303, 304, 312, and 315, the storage apparatus 314, and the processing apparatus 316) is approximately the same as that of the information processing apparatus 200. For this reason, here, only the information processing apparatus 200 will be described, and a part of description of the other apparatuses will not be presented.

The information processing apparatus 200 includes: a first radio communication unit 210; a second radio communication unit 220; a control unit 230; a storage unit 240; and a processing unit 250. Such units are interconnected through a bus 260. The information processing apparatus 200, for example, is a personal computer or a server.

The first radio communication unit 210 is a module (for example, a wireless LAN modem) used for transmitting/receiving electric waves through an antenna 211.

The second radio communication unit 220 is a module (for example, a modem of a network other than the wireless LAN) used for transmitting/receiving electric waves through an antenna 221.

In addition, the first radio communication unit 210 and the second radio communication unit 220 correspond to the first radio communication unit 110 and the second radio communication unit 120 illustrated in FIG. 2. Thus, description thereof will not be presented here.

In addition, the first radio communication unit 210 and the second radio communication unit 220 may execute radio communication using electric waves (electromagnetic waves) or radio communication (for example, radio communication executed using a magnetic field) using a medium other than electric waves.

Furthermore, the first radio communication unit 210 and the second radio communication unit 220 may be configured as mutually-different devices, or the first radio communication unit 210 and the second radio communication unit 220 may be configured as same physical devices.

In addition, while an example, in which the information processing apparatus 200 includes the first radio communication unit 210 and the second radio communication unit 220, is illustrated in FIG. 4, any one thereof may be arranged in the information processing apparatus 200.

Furthermore, at least one of the first radio communication unit 210 and the second radio communication unit 220 may be configured as an external apparatus.

The storage unit 240 is a memory that stores various kinds of information. For example, various kinds of information (for example, a control program) that is necessary for the information processing apparatus 200 to execute a desired operation is stored in the storage unit 240. In addition, in the storage unit 240, for example, the process management table 270 illustrated in FIG. 5 is stored.

The control unit 230 controls each unit of the information processing apparatus 200 based on the control program stored in the storage unit 240. For example, the control unit 230 executes signal processing of transmitted/received information. The control unit 230 is realized by a CPU. Each process relating to the transmission/reception of data is similar to each process of the control unit 130 illustrated in FIG. 2, and thus, the description thereof will not be presented here.

The processing unit 250 executes each process used for realizing at least one function. Here, the processing unit of each apparatus will be described.

For example, each apparatus configuring the communication system 10 is assumed to have one or more functions in addition to the radio communication function. The functions are functions (1) to (6) described above.

For example, an apparatus (for example, the detection apparatus 301 illustrated in FIG. 1) having a detection function constantly operates the detection function (sensing function) and receives and detects notification information (notification signal) of the information processing apparatus 100. Then, the apparatus having the detection function transmits information (detection information) indicating detection of the information processing apparatus 100 to the other apparatuses that are present on the periphery thereof.

In addition, for example, an apparatus (for example, the input apparatuses 302, 311, and 313 illustrated in FIG. 1) having the input function starts up the operation of the apparatus at timing at which the detection information is received and collects input information (input signal). Furthermore, the apparatus having the input function transmits (propagates) the detection information to the other apparatuses that are present on the periphery thereof. In addition, the apparatus having the input function collects input information based on an instruction transmitted from another apparatus. Here, the timing at which the input information is collected may be any one thereof.

An apparatus (for example, the output apparatuses 303, 305, 312, 315, 317, and 319 illustrated in FIG. 1) having an output function outputs information based on an instruction from another apparatus (for example, the information processing apparatus 200). For example, the apparatus may be configured to execute a defined output operation based on detection information transmitted from an apparatus having the detection function. In addition, for example, the apparatus may execute the defined output operation based on input information transmitted from an apparatus having the input function.

In addition, an apparatus (for example, the power apparatuses 304 and 318 illustrated in FIG. 1) having the power function executes a predetermined operation based on an instruction transmitted from another apparatus (For example, the information processing apparatus 200). For example, the apparatus may be configured to execute a defined operation based on detection information transmitted from an apparatus having the detection function. In addition, for example, the apparatus may be configured to execute a defined operation based on input information transmitted from an apparatus having the input function.

In addition, an apparatus (for example, the information processing apparatus 200) having the process function collects information from an apparatus having the input function, analyzes a context in consideration of the past information, and determines a next process. Then, the apparatus having the process function transmits instruction information to an output destination of the determined next process. In addition, in a case where information to be fed back to the apparatus having the input function is present, the information is acquired and used.

Furthermore, for example, in a case where a content to be updated is present in the information included in the process management table 270 (illustrated in FIG. 5) stored in each apparatus, the apparatus having the process function transmits update information used for updating the content. In addition, the apparatus having the process function collects an output result of an apparatus having the output function and a feedback from a user and determines a next process.

Furthermore, for example, the apparatus having the process function updates information that is necessary for the next context analyzing process. In addition, as the apparatus having the process function, an apparatus having a relatively low function (for example, a function of only processing an instructed content or a function of only executing a defined process) may be used. Furthermore, at least a part of the processes executed by the processing unit 250 may be configured to be executed by the control unit 230.

[Example of Starting-Up Each Apparatus]

Here, an example of a case where each apparatus is started to operate will be illustrated. For example, an apparatus having the detection function is constantly operated with low power. Then, in a case where notification information is detected, the apparatus having the detection function transmits information (detection information) used for a notification of the detection and used for staring up the operation of the other apparatuses that are present on the periphery thereof. In addition, in the case of an apparatus to which the detection information is not directly reachable from the apparatus having the detection function, the detection information can be notified by each apparatus relaying the detection information to another apparatus.

In addition, the apparatus having the process function may be configured to make a prediction based on past learning or a context analysis and transmit instruction information instructing an apparatus having a necessary function to be started to operate.

Furthermore, in the case of an apparatus capable of directly detecting the notification information, the apparatus may be configured to be started to operate when the notification information is received.

[Example of Ending Operation of Each Apparatus]

Next, an example of a case where the operation of each apparatus ends will be illustrated. For example, in the case of an apparatus capable of directly detecting the notification information, the operation may end at timing when the notification information is not received, and a task to be executed ends.

On the other hand, in the case of an apparatus incapable of directly detecting the notification information, the state is returned to an operation standby state at timing when a task to be executed ends. Alternatively, the state may be returned to the operation standby state at timing when a predetermined time elapses after a task to be executed ends. In addition, the state may transit to an operation state based on an instruction transmitted from an apparatus having the process function.

[Example of Management Content of Process Managing Table]

FIG. 5 is a diagram that schematically illustrates an example of a management content of the process management table 270 stored in the storage unit 240 according to an embodiment of the present technology.

The process management table 270 is a table that is used when the information processing apparatus 200 executes each process.

In the process management table 270, positional information 271, function information 272, an event type 273, a notification destination 274, and a processing content 275 are stored in association with each other.

The positional information 271 is information relating to a position (place) at which the information processing apparatus 200 is present. For example, in a case where a positional information acquiring unit (for example, estimating a position based on a GPS or information supplied from the outside) acquiring positional information is included in the information processing apparatus 200, the acquired positional information is stored. In addition, for example, the positional information may be stored in accordance with a user's manual operation. In addition, as the positional information, absolute positional information (for example, the longitude, the latitude, and the altitude) may be stored, or different positional information (for example, information (for example, a living room) specifying a room inside a house) may be stored.

Here, an acquisition method used by each apparatus configuring the communication system 10 for acquiring the positional information will be described. For example, in a case where an apparatus (additional apparatus) that is newly added to an existing mesh network acquires positional information, the additional apparatus transmits/receives frames to/from apparatuses that are present on the periphery. Then, the additional apparatus measures a reception signal strength and a round trip time (RTT) based on the transmission/reception and can estimate distances to the other apparatuses that are present on the periphery thereof based on a result of the measurement.

In addition, the additional apparatus acquires the positional information of a known apparatus from the apparatus (for example, a fixed-type apparatus such as a printer) of which the position is known and can estimate the positional information of the additional apparatus by referring to the positional information. For example, based on positional information acquired from an apparatus present at a position closest to the additional apparatus and an estimated distance from the apparatus, the position of the additional apparatus can be estimated.

It is preferable that the positional information acquired in this way is occasionally updated. For example, it may be configured such that a reception signal strength of a frame previously exchanged with another apparatus present on the periphery is measured at the time of starting up the operation of the apparatus, at the time of ending the operation of the apparatus, or the like, and the positional information is updated based on a result of the measurement.

In addition, the positional information may be acquired by using a mobile apparatus (for example, the information processing apparatus 100). For example, the mobile apparatus transmits/receives frames to/from another apparatus while moving inside the range of the communication system 10 and measures a reception signal strength and an RTT based on the transmission/reception. Then, the mobile apparatus estimates a distance up to another apparatus based on a result of the measurement and the positional information (for example, the absolute position, the movement distance, and the moving direction) relating to the mobile apparatus and generates a positional information list relating to each apparatus. The positional information list (final result) generated in this way may be transmitted to each apparatus as a feedback so as to be stored in the process management table of a storage unit of each apparatus.

By updating the positional information at timing when the mobile apparatus moves, the positional information list can be updated with latest information. In addition, for example, the measurement process and the update process may be repeated so as to be learned.

The function information 272 is information relating to the function included in the information processing apparatus 200. The function information 272 corresponds to the function information 162 illustrated in FIG. 3.

The event type 273 is the type of an event. Here, an event, for example, is a content detected by each apparatus configuring the communication system 10 or a content processed by each apparatus. For example, a case where the presence of the information processing apparatus 100 is detected by the detection apparatus 301 may be configured as one event. In addition, for example, a case where a predetermined input is made by the input apparatus 313 may be configured as one event. In other words, the type of an event occurring in accordance with each apparatus configuring the communication system 10 is stored therein.

The notification destination 274 is information (notification destination information) relating to an apparatus that is notified of an indication of an occurrence of an event in a case where the event stored in the event type 273 occurs. For example, identification information (for example, apparatus-specific identification information (for example, a terminal ID or a MAC address) or the information representing the type of apparatus) of an apparatus of a notification destination is stored. As the notification destination, for example, either one apparatus or a plurality of apparatuses may be stored. In addition, in a case where the plurality of apparatuses are registered in the notification destination 274, the plurality of apparatuses may be notified of the occurrence of an event at the same time or be sequentially notified of the occurrence. For example, the plurality of apparatuses may be notified of the occurrence of an event at the same time through multicast transmission, or the occurrence of an event may be transmitted sequentially to the plurality of apparatuses through unicast transmission.

In addition, in a case where an event stored in the event type 273 occurs, a case may be considered in which only the apparatus in which the event type 273 is stored executes a process according to the event. In such a case, the identification information of the apparatus may be stored in the notification destination 274, or nothing may be stored in the notification destination 274.

The processing content 275 is a content of a process executed according to an event in a case where the event stored in the event type 273 occurs. For example, in a case where the presence of an information processing apparatus in which "starting up the operation of a television set" is stored in the capability 164 illustrated in FIG. 3 is detected, a process for displaying a video in a display unit of the television set and outputting an audio from an audio output unit is stored therein.

Here, the information stored in the process management table 270 is occasionally added, updated, or deleted by the control unit 230. For example, every time when an event of each function occurs, the control unit 230 executes deletion, addition, update, or the like of information corresponding to the event based on the processing content corresponding to the event. In such a case, for example, the control unit 230 may be configured to execute deletion, addition, update, or the like of information corresponding to the event by using a learning function.

In addition, another apparatus may execute deletion, addition, or update of the process management table of the apparatus based on the instruction information supplied from the information processing apparatus 200. Alternatively, such a process may be regularly executed by the information processing apparatus 200. As above, each apparatus maintains the process management table, whereby the process of each apparatus can be determined in a speedy manner when an event occurs next time.

Furthermore, while an example has been illustrated in FIG. 5 in which the event type 273 and the notification destination 274 are stored in the process management table 270, such information may be omitted. In a case where such information is omitted, for example, a notification destination may be appropriately determined based on the processing content.

[Example of Communication]

Figure 6:
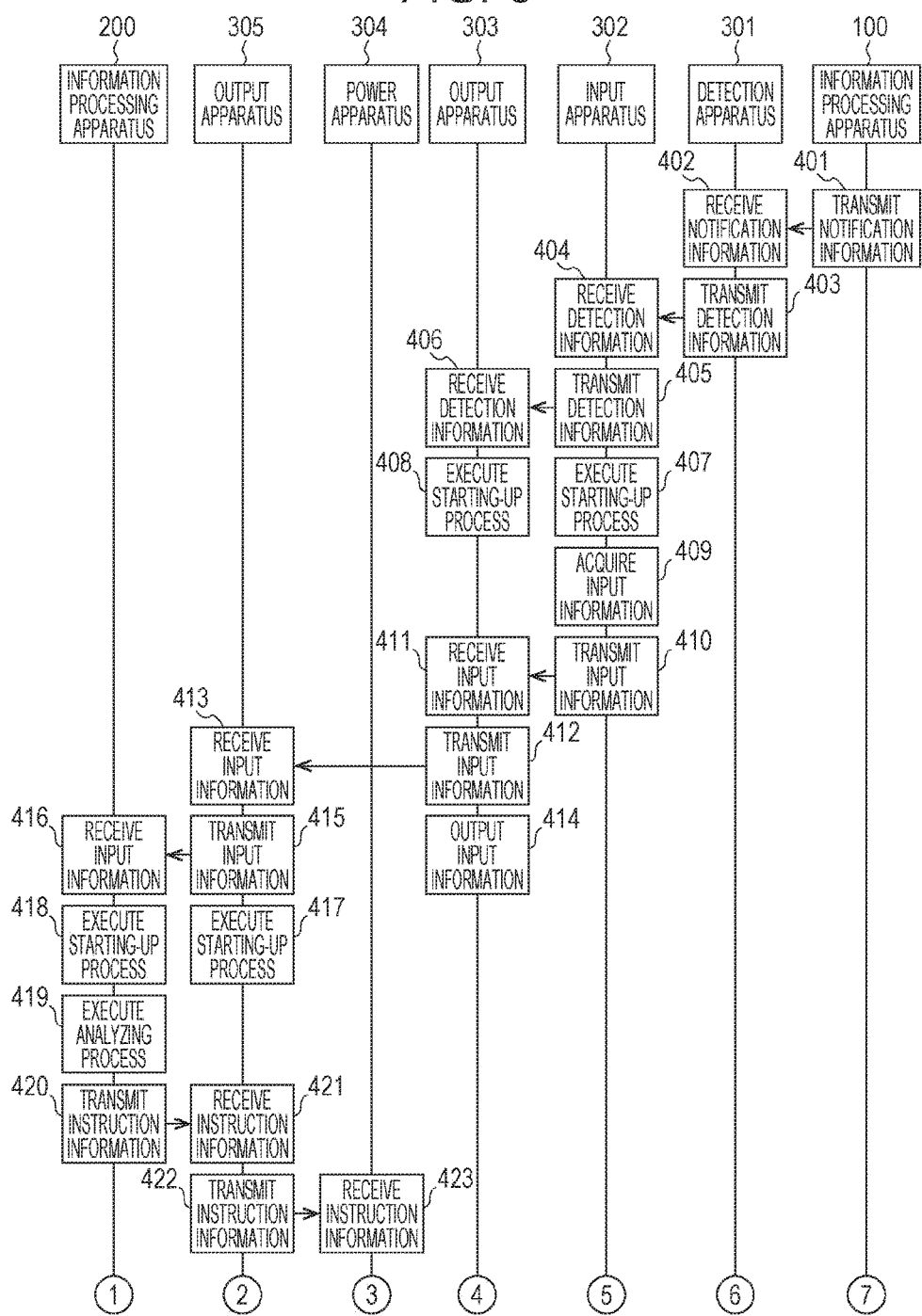
FIG. 6 is a sequence diagram that illustrates an example of a communication process between apparatuses configuring the communication system 10 according to the first embodiment of the present technology.
Figure 7:
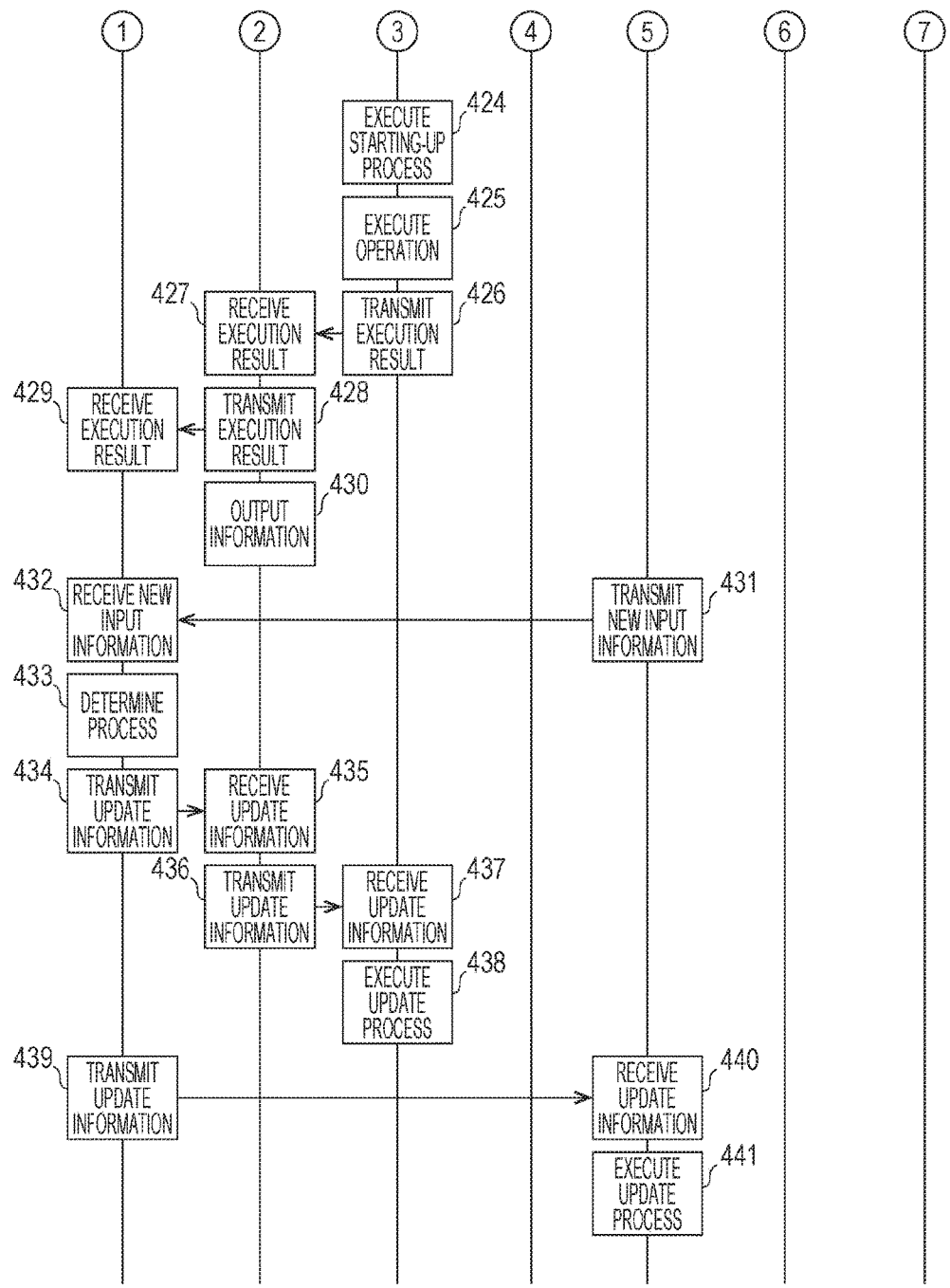
FIG. 7 is a sequence diagram that illustrates an example of a communication process between apparatuses configuring the communication system 10 according to the first embodiment of the present technology.

FIGS. 6 and 7 are sequence diagrams that illustrate an example of a communication process between apparatuses configuring the communication system 10 according to the first embodiment of the present technology. FIGS. 6 and 7 illustrate an example of the communication process of a case where the apparatuses are present in a topology illustrated in FIG. 1.

First, the information processing apparatus 100 possessed (or worn) by the user 20 regularly (or intermittently or irregularly) transmits the notification information (401). For example, in a case where the user 20 moves near the detection apparatus 301, the detection apparatus 301 receives notification information transmitted from the information processing apparatus 100 (402). Accordingly, the detection apparatus 301 can detect that the information processing apparatus 100 (user 20) is present nearby.

Subsequently, the detection apparatus 301 notifies another apparatus present on the periphery of an indication of the detection of the information processing apparatus 100 and transmits information (detection information) used for starting up the operation thereto (403 and 404). For example, the detection apparatus 301 transmits the detection information to the input apparatus 302 (403 and 404). In FIG. 6, for the convenience of description, while an example is illustrated in which the detection apparatus 301 transmits the detection information only to the input apparatus 302, the detection apparatus 301 is assumed to transmit the detection information also to the other apparatuses that are present on the periphery thereof.

When the detection information is received (404), the input apparatus 302 transmits the detection information to the other apparatuses that are present on the periphery thereof (405 and 406).

For example, the input apparatus 302 transmits the detection information to the output apparatus 303 that is present nearby (405 and 406). In FIG. 6, for the convenience of description, while an example is illustrated in which the input apparatus 302 transmits the detection information only to the output apparatus 303, the input apparatus 302 is assumed to transmit the detection information also to the other apparatuses that are present on the periphery thereof.

In addition, the input apparatus 302 that has received the detection information executes a starting-up process for operating an input function (407). Furthermore, the output apparatus 303 that has received the detection information executes a starting-up process for operating an output function (408).

Subsequently, the input apparatus 302 executes the process of acquiring input information (409). In other words, the input apparatus 302 executes a process for collecting information. For example, in a case where the input apparatus 302 is an imaging apparatus, an object (for example, a person's face) is imaged so as to generate image information (input information) (409). In such a case, in a case where the input apparatus 302 has a face recognition function, the input apparatus 302 may execute a face recognition process based on the generated image information and set a result of the recognition as the input information. In addition, for example, in a case where the input apparatus 302 is an operation reception apparatus, the input apparatus 302 acquires information relating to a user's operation as the input information (409).

Subsequently, the input apparatus 302 transmits the acquired input information to another apparatus that is present on the periphery thereof (410 and 411). In FIG. 6, for the convenience of description, while an example is illustrated in which the input apparatus 302 transmits the input information only to the output apparatus 303, the input apparatus 302 is assumed to transmit the input information also to the other apparatuses that are present on the periphery thereof as is necessary.

In a case where the input information is received (411), the output apparatus 303 transmits the input information to another apparatus that is present on the periphery thereof (412 and 413). In FIG. 6, for the convenience of description, while an example is illustrated in which the output apparatus 303 transmits the detection information only to the output apparatus 305, the output apparatus 303 is assumed to transmit the detection information also to the other apparatuses that are present on the periphery thereof as is necessary.

In addition, the output apparatus 303 executes an operation that is based on the received detection information (414). For example, in a case where the operation that is based on the detection information is an operation of outputting the input information acquired by the input apparatus 302, the output apparatus 303 executes an operation of outputting the input information transmitted from the input apparatus 302 (414). Although not illustrated in FIG. 6 for the convenience of description, after the operation that is based on the received detection information is executed (414), a result of the execution of the operation may be configured to be transmitted to the other apparatuses that are present on the periphery thereof.

In a case where the input information is received (413), the output apparatus 305 transmits the input information to another apparatus that is present on the periphery thereof (415 and 416). For example, the output apparatus 305 transmits the input information to the information processing apparatus 200 that is present nearby (415 and 416). In FIG. 6, while an example is illustrated in which the output apparatus 305 transmits the input information only to the information processing apparatus 200, the output apparatus 305 may transmit the input information also to the other apparatuses that are present on the periphery thereof.

In addition, the output apparatus 305 that has received the input information executes a starting-up process for operating the output function (417).

In addition, the information processing apparatus 200 that has received the input information executes a starting-up process used for executing a context analyzing process (418).

Subsequently, the information processing apparatus 200 executes a context analyzing process for the input information (419).

Subsequently, the information processing apparatus 200 transmits instruction information used for realizing a result of the context analyzing process to an apparatus executing the instruction (420 to 423). In such a case, to an apparatus for which information is not directly transmittable from the information processing apparatus 200, the instruction information is transmitted through another apparatus.

The power apparatus 304 that has received the instruction information executes a starting-up process used for executing a process that is based on the instruction information (424).

Subsequently, the power apparatus 304 executes the process that is based on the received instruction information (425). For example, in a case where the power apparatus 304 is a door, the door is opened or closed based on the received instruction information.

Subsequently, the power apparatus 304 transmits a result of the execution of the output process to the information processing apparatus 200 (426 to 429). For example, the result of the execution of the output process may be configured to be transmitted at timing when the output process ends, or the result of the execution of the output process may be configured to be transmitted regularly or irregularly during the execution of the output process.

In addition, in a case where the result of the execution of the output process is received (427), the output apparatus 305 transmits the result of the execution of the output process to the information processing apparatus 200 (428 and 429) and executes an operation that is based on the result of the execution of the output process (430).

Furthermore, in a case where new input information is acquired, the input apparatus 302 transmits the new input information to the information processing apparatus 100 (431 and 432). In addition, the information processing apparatus 200 executes a determination process determining whether or not the process management table (corresponding to the process management table 270 illustrated in FIG. 5) of another apparatus is updated based on the information that has been newly received (433). Then, to the apparatus of which the process management table is determined to be updated, the information processing apparatus 200 transmits update information used for updating the process management table (434 to 437, 439, and 440).

In addition, the apparatus that has received the update information updates the process management table of the apparatus based on the received update information (438 and 441).

[Example of Operation of Each Apparatus]

Next, an example of the operation of each apparatus configuring the communication system 10 will be described.

[Example of Operation of Information Processing Apparatus Possessed by User]

Figure 8:
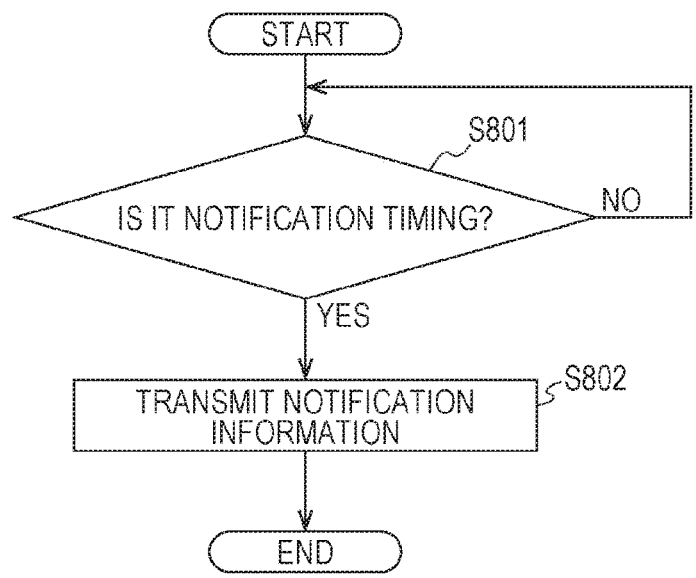
FIG. 8 is a flowchart that illustrates an example of the processing sequence of a notification information transmitting process executed by the information processing apparatus 100 according to the first embodiment of the present technology.

FIG. 8 is a flowchart that illustrates an example of the processing sequence of a notification information transmitting process executed by the information processing apparatus 100 according to the first embodiment of the present technology.

The control unit 130 of the information processing apparatus 100 determines whether or not it is the timing for transmitting the notification information (step S801). The control unit 130, for example, determines whether or not it is the timing for transmitting the notification information based on a content of the notification interval 163 illustrated in FIG. 3 (Step S801). Then, in a case where it is not the timing for transmitting the notification information (step S801), the control unit 130 continues to execute the monitoring process.

On the other hand, in a case where it is the timing for transmitting the notification information (step S801), the control unit 130 transmits the notification information to the other apparatuses that are present on the periphery thereof (step S802). For example, the control unit 130 transmits the information of the notification information management table 160 illustrated in FIG. 3 with being included in a beacon (step S802).

[Example of Operation of Detection Apparatus]

Figure 9:
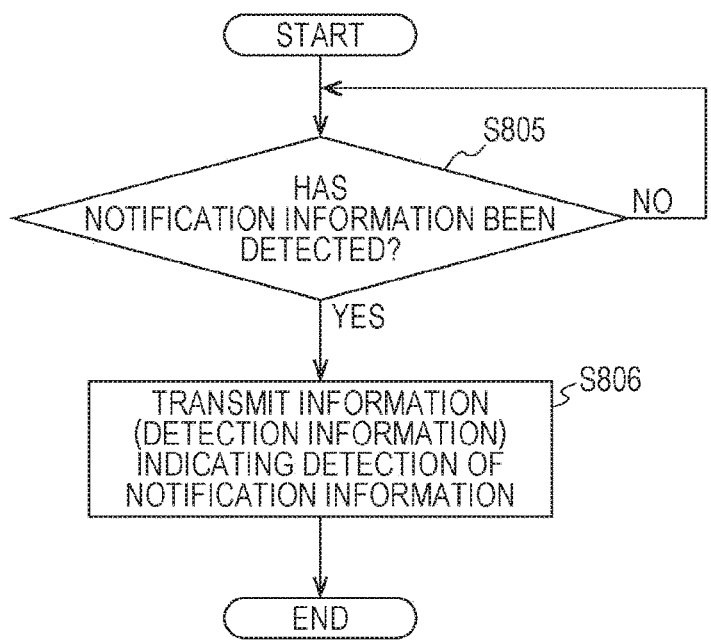
FIG. 9 is a flowchart that illustrates an example of the processing sequence of an apparatus detecting process executed by a detection apparatus 301 according to the first embodiment of the present technology.

FIG. 9 is a flowchart that illustrates an example of the processing sequence of an apparatus detecting process executed by the detection apparatus 301 according to the first embodiment of the present technology. In FIG. 9, while an example of the operation of the detection apparatus 301 is illustrated, the operation of each of the other detection apparatuses is similar thereto. The control unit (corresponding to the control unit 230 illustrated in FIG. 4) of the detection apparatus 301 determines whether or not the notification information has been detected (step S805). The control unit of the detection apparatus 301, for example, determines whether or not a beacon including the information of the notification information management table 160 illustrated in FIG. 3 has been received (step S805). Then, in a case where the notification information has not been detected (step S805), the control unit continues to execute the monitoring process. It is preferable that a detection apparatus having an apparatus detecting function monitors the notification information by constantly operating the apparatus detecting function.

In a case where the notification information has been detected (step S805), the control unit of the detection apparatus 301 transmits detection information representing an indication of the detection of the notification information to the other apparatuses that are present on the periphery thereof (step S806). For example, the control unit of the detection apparatus 301 transmits the information (for example, the information of the notification information management table 160 illustrated in FIG. 3) included in the detected notification information with being included in the detection information (step S806).

Here, in a case where the control unit of the detection apparatus 301 can acquire the content of the notification information, the transmission destination of the detection information may be configured to be determined based on the content. For example, the control unit of the detection apparatus 301 may transmit the detection information to an apparatus capable of providing a service corresponding to the content of the capability 164 illustrated in FIG. 3 or a repeater used for transmitting the information up to the apparatus.

[Example of Operation of Input Apparatus]

Figure 10:
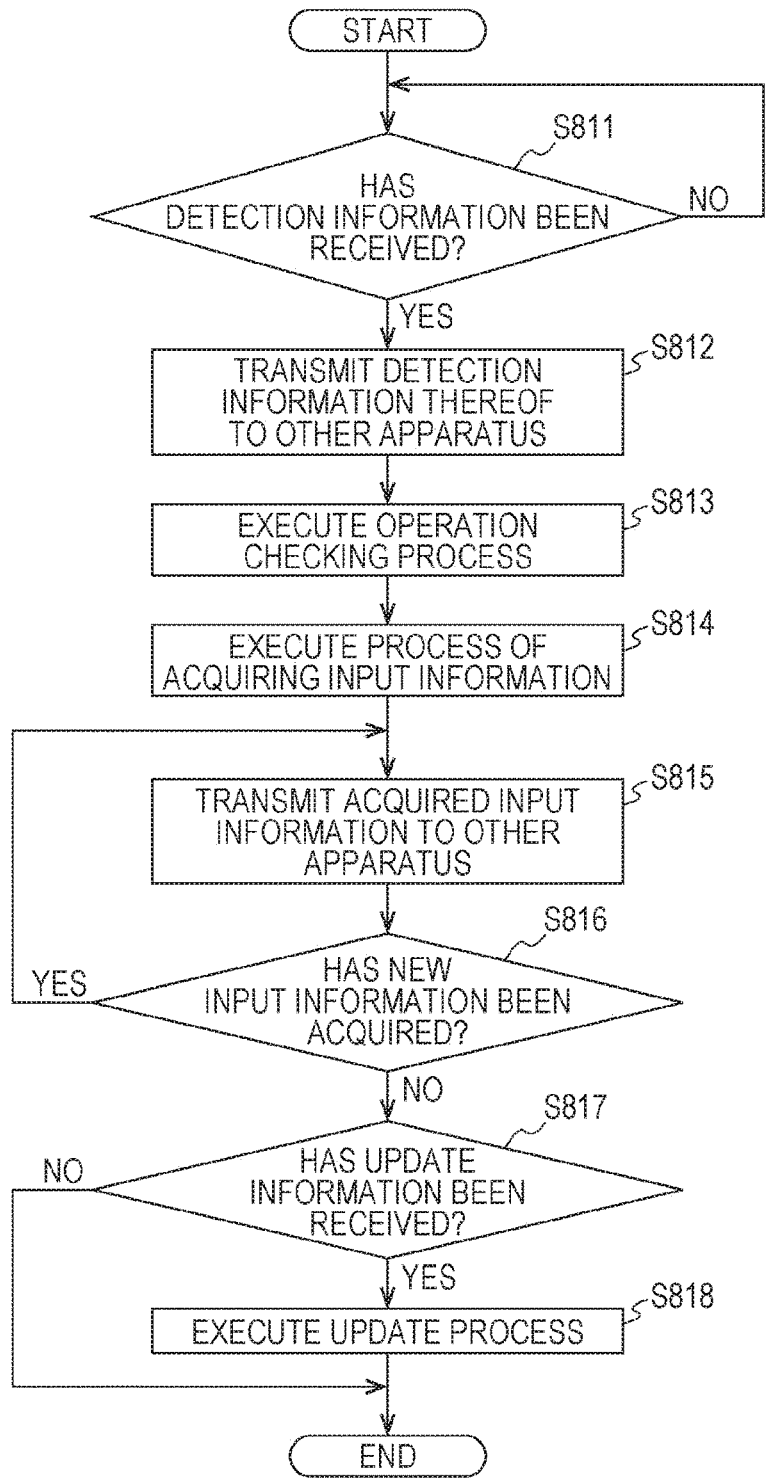
FIG. 10 is a flowchart that illustrates an example of the processing sequence of an information inputting process executed by an input apparatus 302 according to the first embodiment of the present technology.

FIG. 10 is a flowchart that illustrates an example of the processing sequence of an information inputting process executed by the input apparatus 302 according to the first embodiment of the present technology. In FIG. 10, while the example of the operation of the input apparatus 302 is illustrated, the operation of any of the other input apparatuses is similar thereto.

A control unit (corresponding to the control unit 230 illustrated in FIG. 4) of the input apparatus 302 determines whether or not the detection information has been received (step S811). Then, in a case where the detection information has not been received (step S811), the control unit continues to execute the monitoring process.

On the other hand, in a case where the detection information has been detected (step S811), the control unit of the input apparatus 302 transmits the detection information to the other apparatuses that are present on the periphery thereof (step S812).

In addition, similarly to the example illustrated in FIG. 9, in a case where the control unit of the input apparatus 302 can acquire the content of the detection information, a transmission destination of the detection information may be determined based on the content.

Subsequently, the control unit of the input apparatus 302 executes an operation checking process used for operating an input function (step S813). In this operation checking process, it is checked whether or not the input apparatus 302 is in the middle of the operation. In a case where the input apparatus 302 is not in the middle of the operation, the input apparatus 302 is started to operate. On the other hand, in a case where the input apparatus 302 is in the middle of the operation, the process proceeds to step S814 without executing the starting-up process. Subsequently, the control unit of the input apparatus 302 executes a process of acquiring the input information (step S814).

Subsequently, the control unit of the input apparatus 302 transmits the acquired input information to the other apparatuses that are present on the periphery thereof (step S815). Here, similarly to the process of transmitting the detection information, in a case where the control unit of the input apparatus 302 can acquire the content of the detection information, the transmission destination of the input information may be determined based on the content.

Subsequently, the control unit of the input apparatus 302 determines whether or not new input information has been acquired (step S816). Then, in a case where the new input information has been acquired (step S816), the control unit of the input apparatus 302 transmits the newly acquired input information to the other apparatuses that are present on the periphery thereof (step S815).

On the other hand, in a case where new input information has not been acquired (step S816), the control unit of the input apparatus 302 determines whether or not update information has been received from the information processing apparatus 200 (step S817). Then, in a case where the update information has not been received (step S817), the operation of the information inputting process ends.

In a case where the update information has been received from the information processing apparatus 200 (step S817), the control unit of the input apparatus 302 executes an update process of updating the content of a process management table (corresponding to the process management table 270 illustrated in FIG. 5) based on the update information (step S818).

In addition, under the condition that there is no acquisition of new input information or no reception of detection information for a predetermined period or more, the process may transit to a standby state and end the operation of the information inputting process.

[Example of Operation of Output Apparatus]

Figure 11:
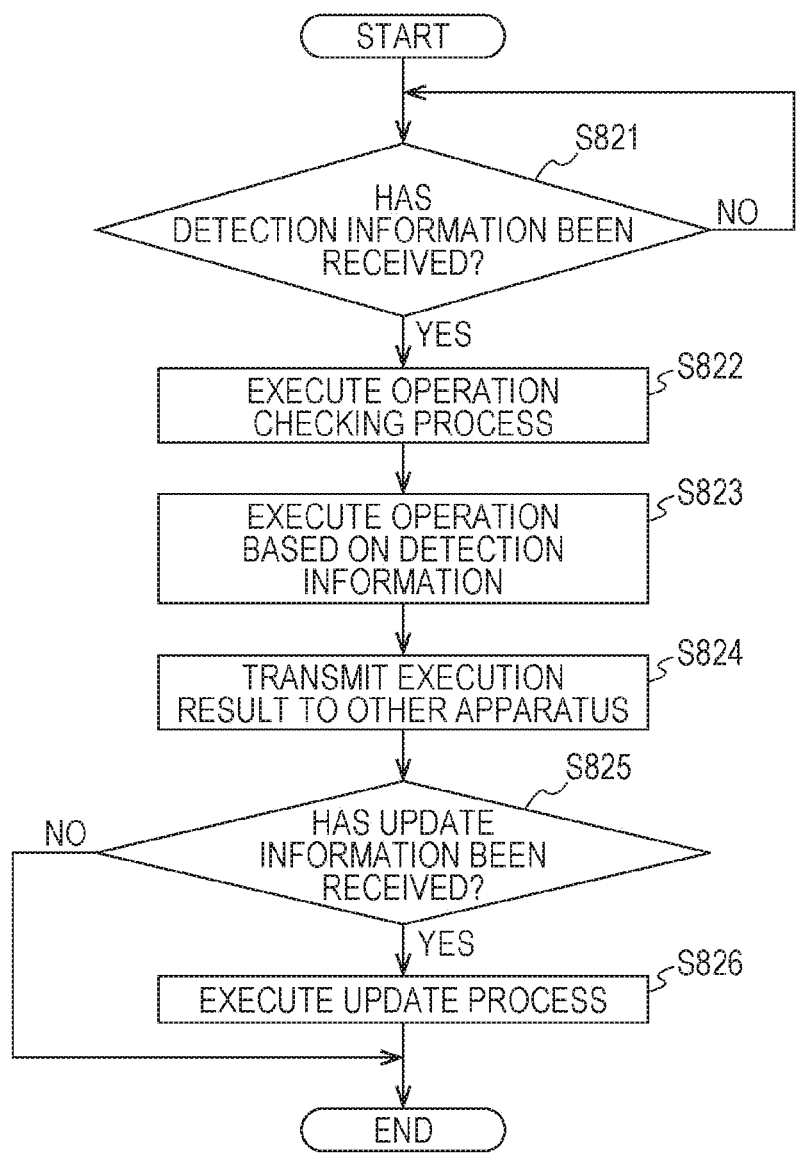
FIG. 11 is a flowchart that illustrates an example of the processing sequence of an information outputting process executed by an output apparatus 303 according to the first embodiment of the present technology.

FIG. 11 is a flowchart that illustrates an example of the processing sequence of an information outputting process executed by the output apparatus 303 according to the first embodiment of the present technology. In FIG. 11, while the example of the operation of the output apparatus 303 is illustrated, the operation of each of the other output apparatuses is similar thereto.

A control unit (corresponding to the control unit 230 illustrated in FIG. 4) of the output apparatus 303 determines whether or not detection information has been received (step S821). Then, in a case where the detection information has not been received (step S821), the control unit continues to execute the monitoring process.

In a case where the detection information has been detected (step S821), the control unit of the output apparatus 303 executes an operation checking process used for operating the output function (step S822). In this operation checking process, it is checked whether or not the output apparatus 303 is in the middle of the operation. Then, in a case where the output apparatus 303 is not in the middle of the operation, the control unit starts up the operation of the output apparatus 303. On the other hand, in a case where the output apparatus 303 is in the middle of the operation, the process proceeds to step S823 without executing the starting-up process. Subsequently, the control unit of the output apparatus 303 executes an operation that is based on the received detection information (step S823).

Here, a case may be also considered in which the content of the detection information is not acquirable for the control unit of the output apparatus 303. In such a case, the control unit of the output apparatus 303 executes an operation based on the instruction information supplied from the information processing apparatus 200.

In addition, while not illustrated in FIG. 11, in a case where the detection information has been detected (step S821), the control unit of the output apparatus 303 may be configured to transmit the detection information to the other apparatuses that are present on the periphery thereof. Subsequently, the control unit of the output apparatus 303 transmits an execution result of the operation to the other apparatuses that are present on the periphery (step S824). Here, the control unit of the output apparatus 303 may be configured to transmit the execution result only to the information processing apparatus 200.

Subsequently, the control unit of the output apparatus 303 determines whether or not update information has been received from the information processing apparatus 200 (step S825).

Then, in a case where the update information has not been received (step S825), the operation of the information outputting process ends.

On the other hand, in a case where the update information has been received from the information processing apparatus 200 (step S825), the control unit of the output apparatus 303 executes an update process of updating the content of a process management table (corresponding to the process management table 270 illustrated in FIG. 5) based on the update information (step S826).

In addition, in a case where new detection information has been received, and the content of the detection information satisfies a predetermined condition (for example, a content representing the use of another output function), the process may transit to a standby state and ends the operation of the information outputting process.

[Example of Operation of Information Processing Apparatus]

Figure 12:
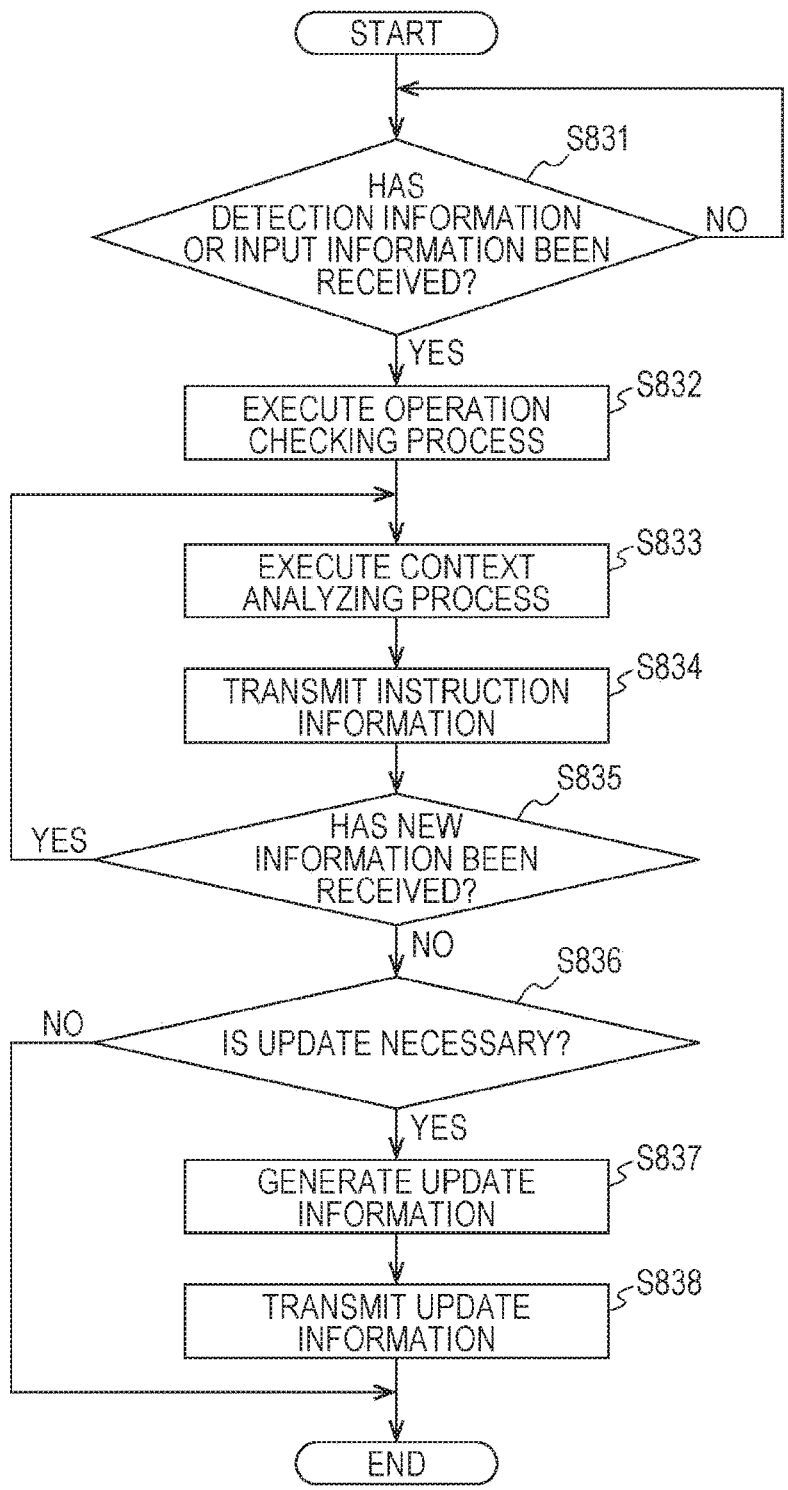
FIG. 12 is a flowchart that illustrates an example of the processing sequence of a context analyzing process executed by the information processing apparatus 200 according to the first embodiment of the present technology.

FIG. 12 is a flowchart that illustrates an example of the processing sequence of the context analyzing process executed by the information processing apparatus 200 according to the first embodiment of the present technology.

The control unit 230 (illustrated in FIG. 4) of the information processing apparatus 200 determines whether or not detection information or input information has been received (step S831). Then, in a case where none of the detection information and the input information has been received (step S831), the control unit continues to execute the monitoring process.

In a case where the detection information or the input information has been received (step S831), the control unit 230 executes an operation checking process for executing a context analyzing process (step S832). In this operation checking process, it is checked whether or not the information processing apparatus 200 is in the middle of the operation. In a case where the information processing apparatus 200 is not in the middle of the operation, the information processing apparatus 200 is started up. On the other hand, in a case where the information processing apparatus 200 is in the middle of the operation, the process proceeds to step S833 without executing the starting-up process. Subsequently, the control unit 230 executes a context analyzing process based on the received information (step S833). Subsequently, the control unit 230 transmits instruction information used for realizing a result of the context analyzing process to an apparatus executing the instruction (step S834).

For example, in a case where the detection information has been received, the control unit 230 extracts an event corresponding to the capability 164 (illustrated in FIG. 3) included in the detection information from the event type 273 (illustrated in FIG. 5) of the process management table 270. Subsequently, in a case where an event corresponding to the capability 164 included in the detection information has been extracted from the event type 273, the control unit 230 acquires the contents of the notification destination 274 and the processing content 275 (illustrated in FIG. 5) corresponding to the extracted event (step S833).

Subsequently, the control unit 230 transmits instruction information used for giving an instruction for executing a process stored in the processing content 275 to an apparatus stored in the acquired notification destination 274 (step S834).

On the other hand, in a case where an event corresponding to the capability 164 included in the detection information is not present in the event type 273, the control unit 230 determines that a process according to the received detection information does not need to be executed. In such a case, the instruction information is not transmitted, but the operation of the context analyzing process ends.

On the other hand, for example, in a case where the input information has been received, the control unit 230 extracts an event corresponding to the input information from the event type 273 (illustrated in FIG. 5) of the process management table 270. Subsequently, in a case where an event corresponding to the input information has been extracted from the event type 273, the control unit 230 acquires contents of the notification destination 274 and the processing content 275 (illustrated in FIG. 5) corresponding to the extracted event (step S833). Here, step S833 is an example of the sequence for determining an apparatus to execute a predetermined process described in the claims.

In addition, the control unit 230 may be configured to transmit the instruction information in consideration of information of the past (the result of the context analyzing process) together with the detection information or the input information that has been received. Furthermore, for example, in a case where a plurality of apparatuses are stored in the notification destination 274 corresponding to the extracted event, the instruction information is transmitted to the plurality of apparatuses.

Subsequently, the control unit 230 determines whether or not new information (for example, detection information, input information, or an execution result) has been received (step S835). Then, in a case where new information has been received (step S835), the process is returned to step S833.

On the other hand, in a case where new information has not been received (step S835), the control unit 230 determines whether or not the update of the process management table of the apparatus that has transmitted the instruction information is necessary (Step S836). Then, in a case where the update is determined to be necessary (step S836), the control unit 230 generates update information used for updating the process management table of the apparatus that has transmitted the instruction information (step S837). Subsequently, the control unit 230 transmits the generated update information to the apparatus that has transmitted the instruction information (step S838).

As above, the control unit 230 can determine an apparatus (for example, an output destination of information that is a target for output) to execute a predetermined process among a plurality of apparatuses based on the function of each apparatus and the positions at which the apparatuses are present in a network in which the plurality of the apparatuses are interconnected. For example, the control unit 230 can determine an output destination (for example, an output destination of a music content) based on the position at which the apparatus (the information processing apparatus 100) possessed by the user is detected. In addition, the control unit 230 can determine the content of the predetermined process and the apparatus to execute the predetermined process based on the input information input by the user. For example, the control unit 230 can determine the content (for example, stock price information) of information that is a target for the output and the output destination (for example, a monitor of a PC) thereof based on the input information (for example, the user wants to see the stock price) input by the user. In addition, the control unit 230 executes a control process (for example, the transmission of the instruction information) used for causing the determined apparatus to execute predetermined information.

[Example of Use of Communication System]

Figure 13:
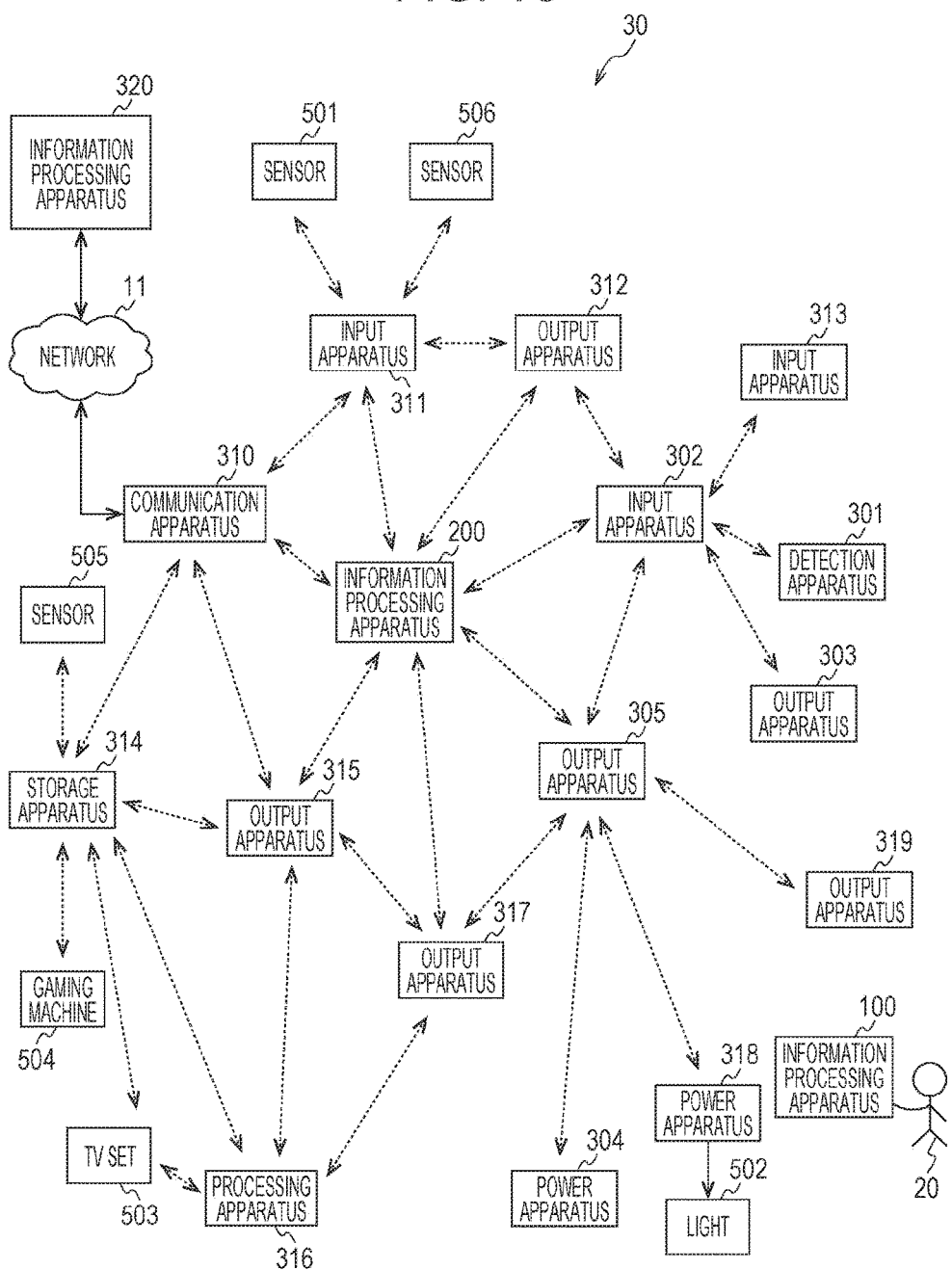
FIG. 13 is a diagram that illustrates an example of the use of a communication system 30 according to the first embodiment of the present technology.

FIG. 13 is a diagram that illustrates an example of the use of a communication system 30 according to the first embodiment of the present technology. The communication system 30 is acquired by adding sensors 501, 505, and 506, a light 502, a TV set 503, and a gaming machine 504 to the communication system 10 illustrated in FIG. 1. Thus, detailed description of each apparatus will not be presented here.

The communication system 30 can be regarded as an example of the apparatus-cooperated use of an integrated system arranged inside a house. For example, inside a house, apparatuses configuring the communication system 30 are arranged at rooms and places in a distributed manner, whereby a mesh network is configured.

Here, a specific example of each apparatus will be described.

The information processing apparatus 100 is an apparatus worn by a user 20.

The detection apparatus 301, for example, is a human sensor that is installed to the outside of the entrance of the house and detects an approaching person. This human sensor, for example, is an apparatus that can be constantly operated with low power.

The input apparatus 302 is a security camera that is installed to the outside of the entrance of the house and generates image data by imaging an object included in an imaging range. In addition, the input apparatus 311, for example, is a microphone that is installed to a first living room. Furthermore, the input apparatus 313, for example, is a microphone that is installed to the outside of the entrance of the house, acquires a surrounding sound, and generates audio data.

The output apparatus 303, for example, is a display (for example, a monitoring display of a security camera) that is installed to the inside of the entrance of the house. In addition, the output apparatus 305, for example, is a display (for example, a television set) that is installed to the inside of the first living room of the house. Furthermore, the output apparatus 312, for example, is audio equipment that is installed to the first living room. In addition, the output apparatus 315, for example, is a projector. Furthermore, the output apparatus 317 is a light that is installed to the inside of the entrance of the house. In addition, the output apparatus 319, for example, is a speaker.

The information processing apparatus 200, for example, is a PC that is installed to a second living room. In addition, the information processing apparatus 320, for example, is a cloud server that is used for realizing cloud computing or a cloud system.

The communication apparatus 310, for example, is an access point used for a connection with the information processing apparatus 320 through the network 11.

The TV set 503, for example, is a television set that is installed to the living room. In addition, the gaming machine 504 is a gaming machine. The storage apparatus 314, for example, is a hard disk drive (HDD) recorder that is installed to the living room.

The power apparatus 304, for example, is an actuator (including the key to the door) that opens or closes the door. In addition, the power apparatus 318, for example, is a light switch that controls turning-on of a light.

The sensors 501, 505, and 506, for example, are BLE apparatuses. The sensor 501 is installed near the first living room. The sensor 506 is installed near the corridor of the first living room. Here, an example of the communication when the user 20 possessing the information processing apparatus 100 returns home will be described with reference to FIGS. 6 and 7.

For example, the information processing apparatus 100 possessed by the user 20 regularly or irregularly transmits notification information (for example, a frame including the information illustrated in FIG. 3) to the other apparatuses that are present on the periphery thereof (401). For example, when the user 20 approaches the entrance of the house, notification information transmitted from the information processing apparatus 100 is received by a detection apparatus 301 (human sensor) that is disposed on the outer side of the entrance of the house (402). In other words, the detection apparatus 301 (human sensor) detects the information processing apparatus 100.

In a case where the notification information is received in this way (402), the detection apparatus 301 (human sensor) gives a notification of the detection of the information processing apparatus 100 and transmits information (detection information) used for starting-up the operation to the other apparatuses that are present on the periphery thereof (403 to 406). In this case, the detection apparatus 301 (human sensor) transmits the detection information to all or some (for example, apparatuses stored in the notification destination 274 illustrated in FIG. 5) of the apparatuses that are present on the periphery thereof (403 to 406).

For example, the detection apparatus 301 (human sensor) transmits the detection information to the input apparatus 302 (security camera) and the input apparatus 313 (microphone) that are installed to the outside of the entrance of the house. In addition, for example, the detection apparatus 301 (human sensor) transmits the detection information to the output apparatus 303 (display) and the output apparatus 317 (light) that are installed to the inside of the entrance of the house. In FIG. 6, some thereof are not illustrated.

For example, the input apparatus 302 (security camera) that has received the detection information from the detection apparatus 301 (human sensor) transmits the detection information to the output apparatus 303 (display) (405 and 406), thereby executing a starting-up process (407). Subsequently, the input apparatus 302 (security camera) images a person present outside the entrance of the house, thereby generating image data (409). Subsequently, the input apparatus 302 (security camera) transmits the generated image data (input information) to the information processing apparatus 200 (410 to 413, 415, and 416). In this case, the input apparatus 302 (security camera) transmits information included in the received detection information to the information processing apparatus 200 together with the generated image data (410 to 413, 415, and 416).

In addition, the output apparatus 303 (display) that has received the image data (input information) from the input apparatus 302 (security camera) transmits the image data to the information processing apparatus 200 (412, 413, 415, and 416), thereby displaying the image data (414). Accordingly, the image captured by the input apparatus 302 (security camera) is displayed on the output apparatus 303 (display). For this reason, for example, a person present inside the entrance of the house can check a person approaching the entrance of the house.

In addition, the output apparatus 305 (display) that has received the image data (input information) from the input apparatus 302 (security camera) transmits the image data to the information processing apparatus 200 (415 and 416), thereby executing a starting-up process (417).

Furthermore, the information processing apparatus 200 (PC) that has received the image data (input information) from the input apparatus 302 (security camera) executes a starting-up process (418). Then, the information processing apparatus 200 (PC) executes the context analyzing process based on the image data (input information), the detection information, and the transmission apparatus (419).

For example, since the notification information is detected by the detection apparatus 301 (human sensor), the information processing apparatus 200 (PC) determines return of a family member or a guest. Thus, the information processing apparatus 200 (PC) executes an authentication process based on the received image data (input information). For example, the information processing apparatus 200 (PC) can execute biometric authentication (for example, face authentication or iris authentication) based on the received image data (input information). For example, the face authentication can be executed by registering face information of family members in the information processing apparatus 200 (PC) and comparing the registered face information with the received image data (input information).

Then, in a case where the authentication is successful through the authentication process, the information processing apparatus 200 (PC) transmits instruction information used for opening the key to the entrance to the power apparatus 304 (actuator) (420 to 423).

The power apparatus 304 (actuator) that has received the instruction information from the information processing apparatus 200 (PC) executes a starting-up process (424) and executes an operation of opening the key to the entrance based on the instruction information (425). Subsequently, the power apparatus 304 (actuator) transmits a result of the execution (execution result) of the operation of opening the key to the entrance to the information processing apparatus 200 (PC) (426 to 429). In addition, the power apparatus 304 (actuator) may urge starting-up by transmitting the notification information to peripheral apparatuses (for example, a microphone, a display, and a light switch) arranged inside the entrance at unlocked timing.

In addition, the light of the entrance may be configured to be turned on by detecting entering of the user 20 into the entrance and transmitting detection information to the power apparatus 318 (light switch) by using another apparatus. Furthermore, the light of the entrance may be turned on by using another method. For example, since the detection information is transmitted from the detection apparatus 301 (human sensor) to the other apparatuses that are present on the periphery thereof, the apparatus installed to a position at which the user 20 is present can be specified based on the positional information included in the detection information.

In addition, the information processing apparatus 200 (PC) may be configured to transmit instruction information for starting up the operations of the peripheral apparatuses arranged at the entrance.

Here, it is assumed that there are many cases where the user 20 moves to the inside of the first living room through the corridor when entering from the entrance. For this reason, it is estimated that, since the user 20 is permitted to unlock the key to the entrance, the user moves from the entrance to the inside of the first living room through the corridor. Thus, the information processing apparatus 200 transmits instruction information used for displaying information necessary for the user 20 moving from the entrance to the inside of the first living room through the corridor on the output apparatus 305 (display) installed inside the first living room (420 and 421). In FIG. 6, while an example has been illustrated in which the instruction information for the output apparatus 305 (display) and the instruction information for the power apparatus 304 (actuator) are simultaneously transmitted, such instruction information may be configured to be separately transmitted.

In addition, for example, the information processing apparatus 200 (PC) displays a content corresponding to the taste of the user 20 on the output apparatus 305 (display). For example, the information processing apparatus 200 (PC) transmits instruction information used for transmitting information to be displayed to the output apparatus 305 (display) to an apparatus in which the information to be displayed on the output apparatus 305 (display) is stored (for example, the storage apparatus 314 or the information processing apparatus 320). In such a case, the output apparatus 305 (display) displays the information transmitted from the apparatus that has received the instruction information (430).

In addition, the content corresponding to the taste of the user 20, for example, may be configured as an image that visually illustrates the one-day digest life log of the user 20, home topics of the house occurring during one day, and the like.

Here, a case may be considered in which information that is automatically displayed on the output apparatus 305 (display) is not information desired by the user 20. In such a case, the user 20 may give an instruction for a content to be displayed on the output apparatus 305 (display). For example, in a case where latest stock price information is desired to be displayed, the user 20 says that "Show the stock price information". In such a case, a microphone that is present on the periphery of the user 20 collects the sound and transmits the collected content (new input information) to the information processing apparatus 200 (PC). In other words, the information of the user 20 is fed back to the information processing apparatus 200 (PC). In such a case, the information processing apparatus 200 (PC) executes a context analyzing process based on the new input information (feedback information) and learning thereof. Then, as a result of the context analyzing process, the information processing apparatus 200 (PC) transmits update information used for an update of an apparatus that is to be updated necessarily.

FIG. 7 illustrates an example in which the user 20 transmits new input information to the information processing apparatus 200 (PC) by inputting new input information by using the input apparatus 302 (security camera) (431 and 432). In addition, an example is illustrated in which apparatuses to be updated necessarily are the input apparatus 302 (security camera) and the power apparatus 304 (actuator), and such update information is transmitted (434 to 437, 439, and 440). In this case, each apparatus (the input apparatus 302 (security camera) and the power apparatus 304 (actuator)) that has received the update information executes an update process for the process management table based on the received update information (438 and 441).

[Example of Communication of Case where Apparatus is in Standby State]

Figure 14:
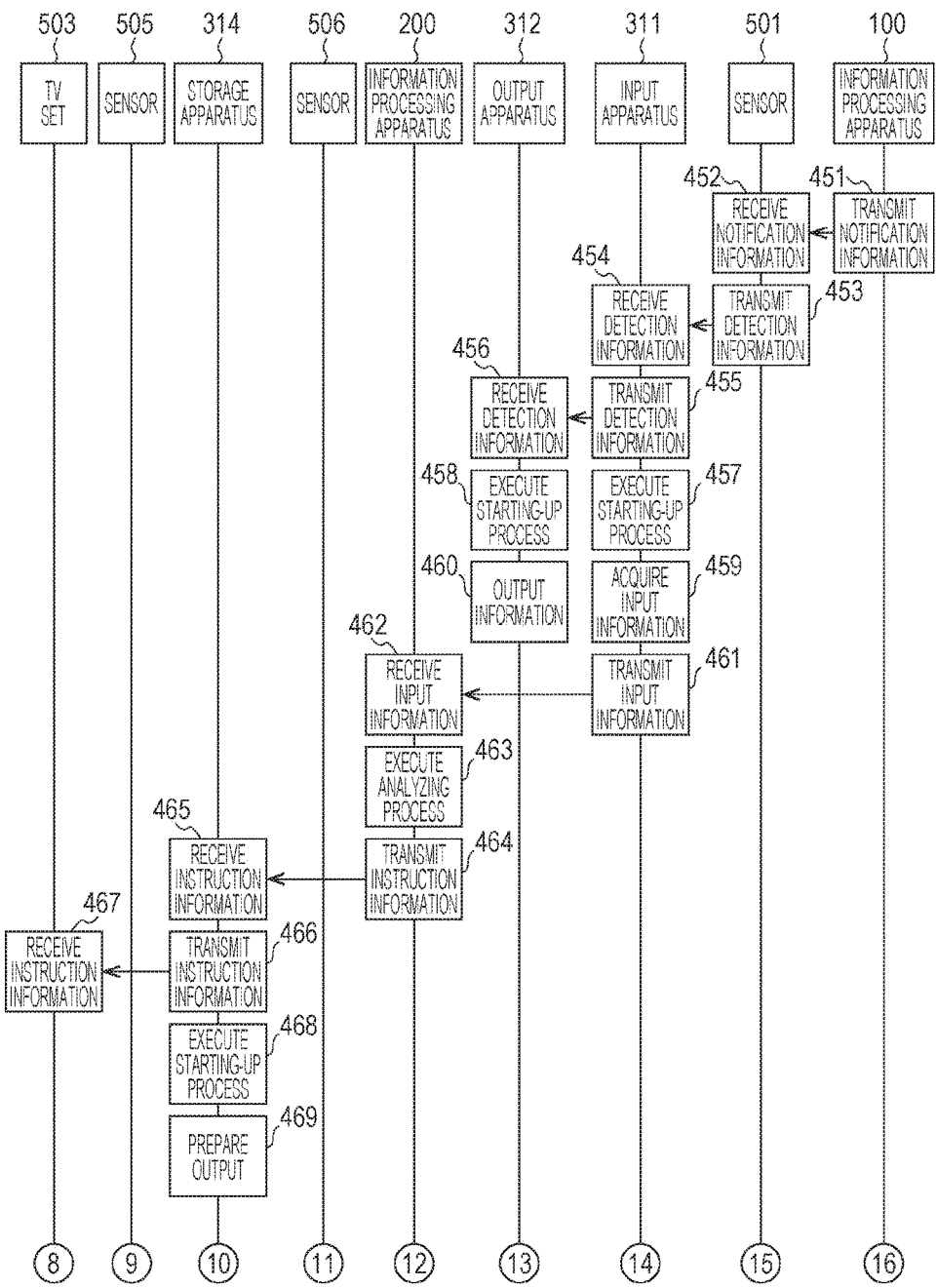
FIG. 14 is a sequence diagram that illustrates an example of a communication process between apparatuses configuring the communication system 30 according to the first embodiment of the present technology.
Figure 15:
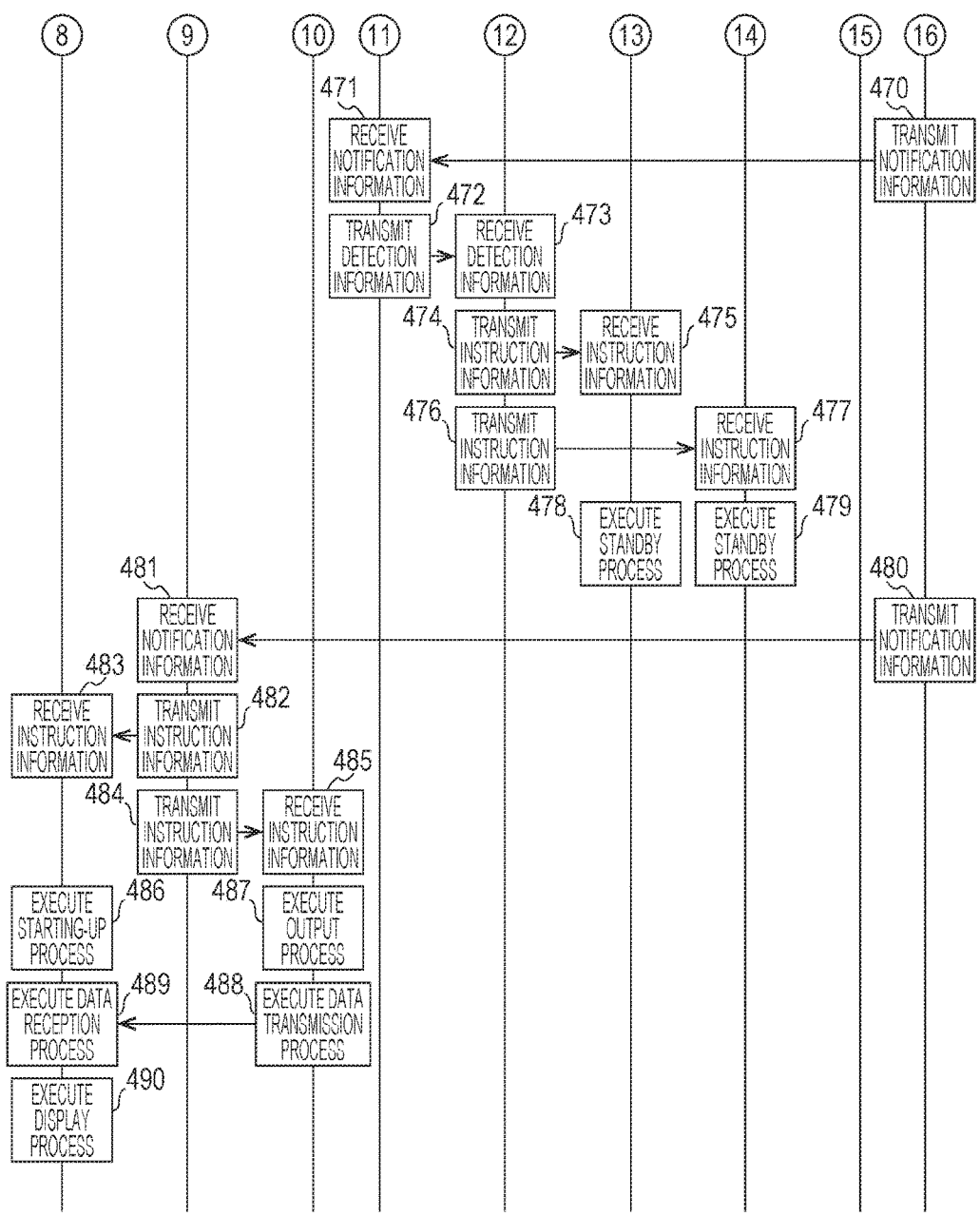
FIG. 15 is a sequence diagram that illustrates an example of a communication process between apparatuses configuring the communication system 30 according to the first embodiment of the present technology.

FIGS. 14 and 15 are sequence diagrams that illustrate an example of a communication process between apparatuses configuring the communication system 30 according to the first embodiment of the present technology. FIGS. 14 and 15 illustrate an example of the communication process of a case where each apparatus is in a standby state in a case where apparatuses are present in the topology illustrated in FIG. 13.

First, a case will be considered in which the user 20 moves in a direction toward the side of the first living room. In this case, notification information transmitted from the information processing apparatus 100 possessed by the user 20 is received by the sensor 501 that is installed near the first living room (451 and 452). Accordingly, it is detected that the information processing apparatus 100 (the user 20) approaches the first living room.

Subsequently, the sensor 501 transmits detection information indicating detection of the information processing apparatus 100 to the other apparatuses (for example, the input apparatus 311 (microphone) and the output apparatus 312 (audio equipment)) that are present on the periphery thereof (453 to 456). By transmitting the detection information used for starting up the operation of each apparatus as above, the apparatuses arranged inside the first living room that is the movement destination of the user 20 can be started to operate. The input apparatus 311 (microphone) collects a sound generated by the user 20 (459). In addition, the output apparatus 312 (audio equipment) outputs music corresponding to the taste of the user 20 (460).

Accordingly, for example, inside the first living room, the user 20 can execute various operations while listening to the music output from the output apparatus 312 (audio equipment) (460).

For example, when the user 20 changes clothes while listening to the music output from the output apparatus 312 (audio equipment) (460), in a case where the user says that "I want to view today's series drama xxx in the living room", the input apparatus 311 (microphone) collects the sound (459). In such a case, the input apparatus 311 (microphone) transmits speech information corresponding to the sound to the information processing apparatus 200 as input information (461 and 462).

In a case where the input information is received (462), the information processing apparatus 200 executes the context analyzing process for the input information (463). Then, the information processing apparatus 200 transmits instruction information to the storage apparatus 314 (HDD recorder) and the TV set 503 installed in the living room (464 to 467). This instruction information is instruction information for instructing the storage apparatus 314 (HDD recorder) to prepare to transmit the series drama xxx recorded today to the TV set 503 and instructing the TV set 503 to execute reproduction at timing at which the user 20 moves to the living room. Here, the timing at which the user 20 moves to the living room, for example, may be configured as timing when a predetermined time (for example, five seconds) elapses after the reception of the detection information indicating the detection of the information processing apparatus 100 from the sensor 505 installed near the living room.

In a case where the instruction information has been received (465), the storage apparatus 314 (HDD recorder) executes a starting-up process (468) and prepares to transmit the series drama xxx recorded today to the TV set 503 (469).

Subsequently, when the user 20 comes out to the corridor so as to move to the living room, the notification information transmitted from the information processing apparatus 100 possessed by the user 20 is received by the sensor 506 that is installed near the corridor of the first living room (470 and 471). Accordingly, it is detected that the user 20 has come out from the first living room.

Subsequently, the sensor 506 transmits detection information indicating detection of the information processing apparatus 100 to the information processing apparatus 200 (472 and 473). In a case where the detection information has been received (473), the information processing apparatus 200 transmits instruction information to the input apparatus 311 (microphone) and the output apparatus 312 (audio equipment) that are installed inside the first living room (474 to 477). This instruction information is instruction information used for giving a power-down instruction for lowering the power to be in a wakeup-enabled state (for example, a standby state). In a case where the instruction information is received (475 and 477), the input apparatus 311 (microphone) and the output apparatus 312 (audio equipment) execute a standby process and transit to the standby state (478 and 479).

Subsequently, when the user 20 moves to the living room, notification information transmitted from the information processing apparatus 100 possessed by the user 20 is received by the sensor 505 installed near the living room (480 and 481). Accordingly, the movement of the user 20 to the living room is detected.

Subsequently, the sensor 505 transmits detection information indicating the detection of the information processing apparatus 100 to the storage apparatus 314 (HDD recorder) and the TV set 503 that are installed in the living room (482 to 485).

In a case where the detection information is received (485), the storage apparatus 314 (HDD recorder) executes an output process for outputting a content (the series drama xxx recorded today) relating to the instruction given from the information processing apparatus 200 (487). Then, the storage apparatus 314 (HDD recorder) executes a data transmission process of transmitting the content to the TV set 503 (488).

In addition, in a case where the detection information has been received (483), the TV set 503 executes a starting-up process (486). Subsequently, the TV set 503 executes a data reception process of receiving the content (the series drama xxx recorded today) relating to the instruction given from the information processing apparatus 200 from the storage apparatus 314 (HDD recorder) (489). Subsequently, the TV set 503 executes image display and audio output based on the received data (490).

[Example of Changing Output Destination According to User's Movement]

Figure 16:
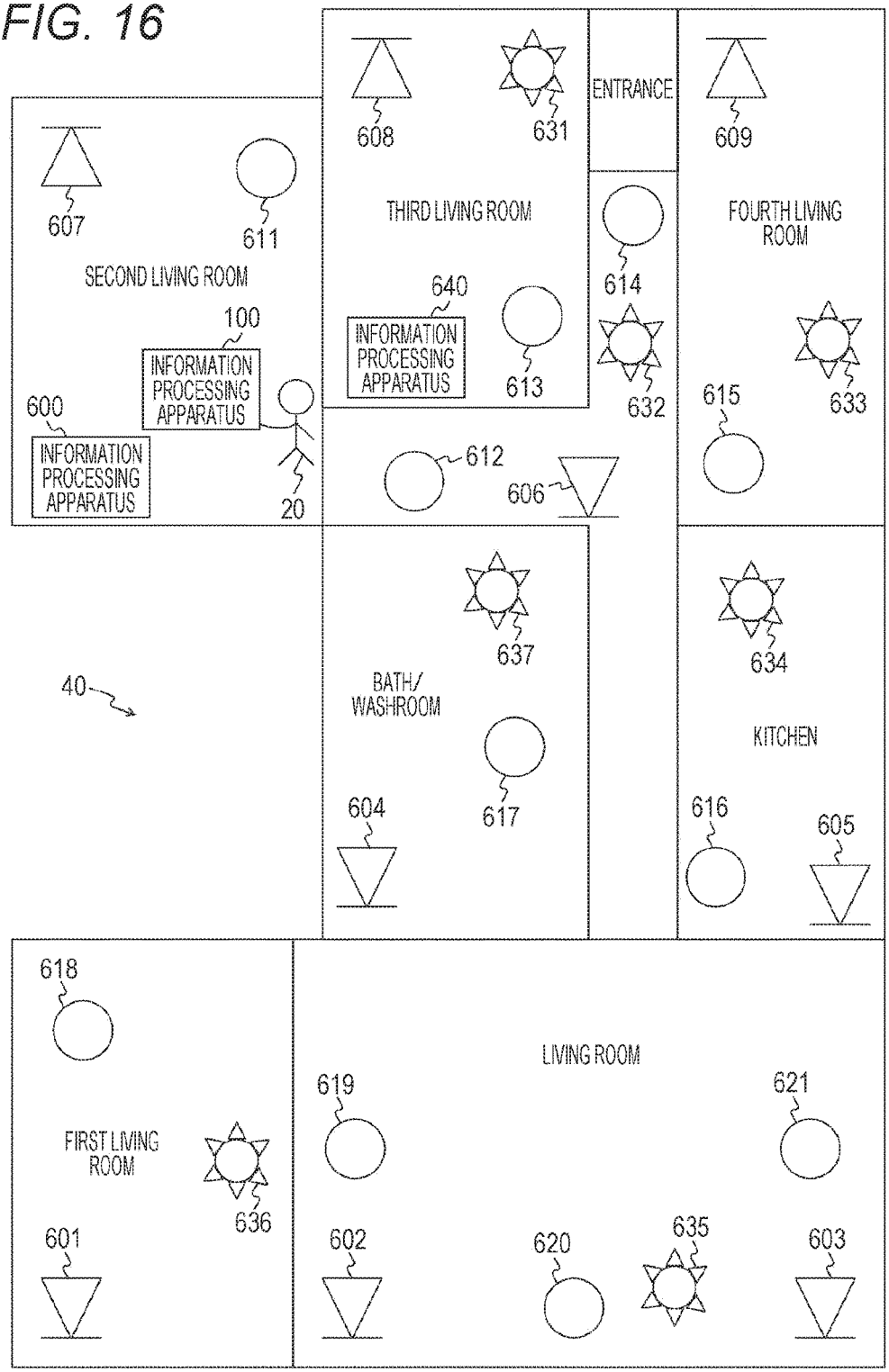
FIG. 16 is a diagram that illustrates an example of the system configuration of a communication system 40 according to the first embodiment of the present technology.

FIG. 16 is a diagram that illustrates an example of the system configuration of a communication system 40 according to the first embodiment of the present technology.

The communication system 40 includes: information processing apparatuses 100, 600, and 640; speakers 601 to 609; sensors 611 to 621; and microphones 631 to 637. Such apparatuses are assumed to be installed in each room arranged inside the house. In addition, such apparatuses are connected through an ad hoc network or a mesh network.

The information processing apparatus 600 is a content server that stores a music content and outputs the music content based on an instruction from the information processing apparatus 640. The information processing apparatus 640 is an information processing apparatus that executes a context analyzing process. A third living room is assumed to be a bed room.

For example, a case will be considered in which the user 20 listens to music that is output from the speaker 607 in the second living room. In such a case, as described above, the information processing apparatus 100 possessed by the user transmits the notification information regularly (or intermittently or irregularly).

When notification information transmitted from the information processing apparatus 100 is received, the sensor 611 transmits detection information indicating the detection of the notification information to the information processing apparatus 600 (content server). In a case where the detection information is received, the information processing apparatus 600 (content server) transmits the detection information to the information processing apparatus 640 that is installed in a room (third living room) located nearby.

In a case where the detection information is received, the information processing apparatus 640 executes a context analyzing process and transmits the instruction information for starting up the operation of each apparatus such that switching between output destinations (speakers) is made in accordance with the movement of the user 20. For example, the information processing apparatus 640 transmits the instruction information to the speakers 604, 606, and 608 and the microphones 631, 632, and 637 that are installed to places close to the speaker 607.

In addition, the information processing apparatus 640 transmits instruction information for giving an instruction for switching the output destination to a speaker installed in the same room as that of the sensor that has transmitted the detection information to the information processing apparatus 600 (content server).

In addition, the information processing apparatus 640 transmits instruction information to apparatuses (for example, a microphone and a speaker) that are directly connected to each sensor. This instruction information is instruction information used for selecting a path up to the information processing apparatus 600 (content server) and transmitting information specifying a speaker to be set as the output destination to the information processing apparatus 600 (content server) in a case where detection information is received from the sensor.

In addition, for example, when the user 20 comes out to the corridor for a bath, the sensor 612 receives notification information transmitted from the information processing apparatus 100. Then, the sensor 612 transmits detection information indicating detection of the information processing apparatus 100 to the information processing apparatus 600 (content server). In this case, the information processing apparatus 600 (content server) switches the output destination of the music to the speaker 606.

Furthermore, in a case where the user 20 moves to a washroom, the sensor 617 receives notification information transmitted from the information processing apparatus 100. Then, the sensor 617 transmits detection information indicating detection of the information processing apparatus 100 to the information processing apparatus 600 (content server) through the microphone 637. In such a case, the information processing apparatus 600 (content server) switches the output destination of the music to the speaker 604.

In this base, based on the detection information transmitted from each sensor, switching between output destinations of the music content can be made.

In addition, for example, based on the detection information transmitted from each sensor, a mobile-type robot may be moved. For example, the mobile-type robot can be led to move to a place (the place at which the user is present) at which the sensor that has transmitted the detection information is installed.

Here, in recent years, for example, the number of types of indoor and outdoor apparatuses having a radio function such as wireless LAN, Bluetooth, NFC, or zigbee increases. For example, there are input apparatuses such as a sensor, a keyboard, a microphone, a scanner, and a camera, output apparatuses such as a speaker, a display, and a projector, and storage apparatuses such as a hard disk and a recorder. In addition, for example, there are an apparatus having both input/output functions, a PC having a high-level processing capability, a smartphone, a tablet, a gaming machine, and a content server storing data. In addition, for example, there are a sensor installed to a window or a door, a security apparatus and a disaster prevention apparatus that operate in cooperation with a cloud server, a refrigerator, a washer, and a water heater having a network function that can be controlled from the outside of a house, a robot having a high-level function, and the like. In addition, it is assumed that the number of radio communication apparatuses having various functions continues to increase in daily life.

A case will be considered in which such apparatuses are used in a combined manner. In such a case, for example, the user possesses a smartphone with him, makes a connection to an access point, and participates in a network arranged inside the area thereof. Then, the user searches for contents available within the network, displays a list of the contents on the smartphone being held with him, selects a content desired to be output from among the contents, and selects an apparatus (for example, a TV set) to be set as an output destination from an output destination apparatus list.

As above, in order to cause an apparatus to execute an operation on which the user's intention is reflected, the possessed apparatus needs to have all the functions to be used such as a display function, an input function, a sound collection function (in case of inputting speech), and a processing function for collecting and analyzing data.

However, a case may be also considered in which no apparatus of a high-level function is possessed by the user. In addition, in a case where the use frequency is high, the capacity of the battery of the apparatus of a high-level function needs to be increased. Furthermore, for example, the user needs to be present at a position at which the apparatus of the high-level function is connectable to a master unit (for example, an access point) of the network.

Thus, according to the first embodiment of the present technology, the functions of a plurality of radio communication apparatuses that are arranged in a distributed manner are cooperatively used in a combined manner, whereby an apparatus of a high-level function is realized as the whole communication system.

For example, based on information acquired from an apparatus having an input function, the user's position and the context can be detected. In addition, for example, the operation may be configured such that an optimal output apparatus to output information is estimated, and a communication path between the input/output apparatuses is dynamically set.

In addition, for example, the operation may be configured such that an input is received from the user, an output apparatus desired by the user is determined based on the user's position and a command supplied from the user, and a communication path between the input/output apparatuses is dynamically set. Furthermore, by learning the positions of the apparatuses arranged in a distributed manner and contexts, the operation can be optimized.

In this way, even when an apparatus of a high-level function is not possessed by the user, the behavior pattern of the user is analyzed, and the operations of apparatuses that are output/input destinations can be determined through an automatic determination. For this reason, the user's intention can be automatically realized.

For example, among the functions included in apparatuses that are installed in a distributed manner, only functions that are necessary at times can be actually operated. Accordingly, the functions of all the apparatuses can be maximally utilized. In addition, in accordance with an increase in the number of apparatuses configuring the network, the number of functions that can be realized by the whole system can be increased, whereby the functions can be further expanded. In addition, as examples of apparatuses having a radio communication, for example, there are a distinctive apparatus having a small number of kinds of functions, an apparatus having various sensors and acquiring many sensor data units, and an apparatus having a high-level function (for example, 4k TV) as an output apparatus, and the like. Furthermore, by collecting a plurality of low-level functions, effective data can be formed, and, by integrally cooperating such functions of multiple types, a high-level function can be realized by the whole system. In addition, a communication path between an apparatus of a high-level function and another apparatus does not need to be constantly secured, but only a necessary communication path is used for the communication, whereby radio resources can be effectively used.

As above, in a case where apparatuses are connected through a mesh network or an ad hoc network, the installation place and the implementable functions of each apparatus are acquired, and such apparatuses can be cooperated. Accordingly, although the function of each apparatus is insufficient, a high-level function can be realized by the whole system. In this way, according to an embodiment of the present technology, an optimal environment according to a user can be provided.

In addition, according to the first embodiment of the present technology, an example has been illustrated in which a high-level context analyzing process is executed, and an information processing apparatus such as a PC is used as an apparatus that gives an instruction for the operation executed thereafter. However, it may be configured such that a high-level context analyzing process is executed, and an apparatus such as a robot that has a high-level processing capability or an external network apparatus such as a cloud server is used as an apparatus that gives an instruction for the operation executed thereafter.

In addition, in accordance with a content of the context analyzing process, processes may be configured to be processed in a distributed manner by a PC, a robot, a cloud server, and the like. Furthermore, in the context analyzing process, by performing learning based on a movement history, an execution history, an input from the user, feedback information, and the like, the accuracy of the function of the entire system for the user can be improved.

While an example of the communication system using radio communication has been illustrated in the first embodiment of the present technology, the first embodiment of the present technology can be applied to a communication system using wired communication. In addition, the first embodiment of the present technology can be applied also to a communication system using both radio communication and wired communication.

2. Second Embodiment

A second embodiment of the present technology illustrates an example in which the area of a network configured by a plurality of apparatuses is expanded.

For example, in the case of the inside of a building (for example, the inside of a house), by arranging apparatuses in a distributed manner at places inside the building in a fixed manner or a movable manner, a mesh network is configured by the apparatuses. As an apparatus possessed by the user is connected to this mesh network, the user's behavior range (for example, the position of an apparatus possessed by the user) within the area can be covered.

However, for example, in the case of a building (for example, a house) having an outdoor area (for example, a large yard or a farm), a case may be also considered in which electric waves of an apparatus arranged inside the building do not reach the outdoor area. For example, in a case where the user moves to the outdoor area, a case may be also considered in which electric waves of an apparatus arranged inside the building do not reach an apparatus possessed by the user. In such a case, a case may be considered in which the user's behavior range is not covered.

Thus, in the second embodiment of the present technology, an example is illustrated in which the area of a mesh network is expanded by using an apparatus that is three-dimensionally movable in the air.

[Configuration Example of Communication System and Example of Communication]

Figure 17:
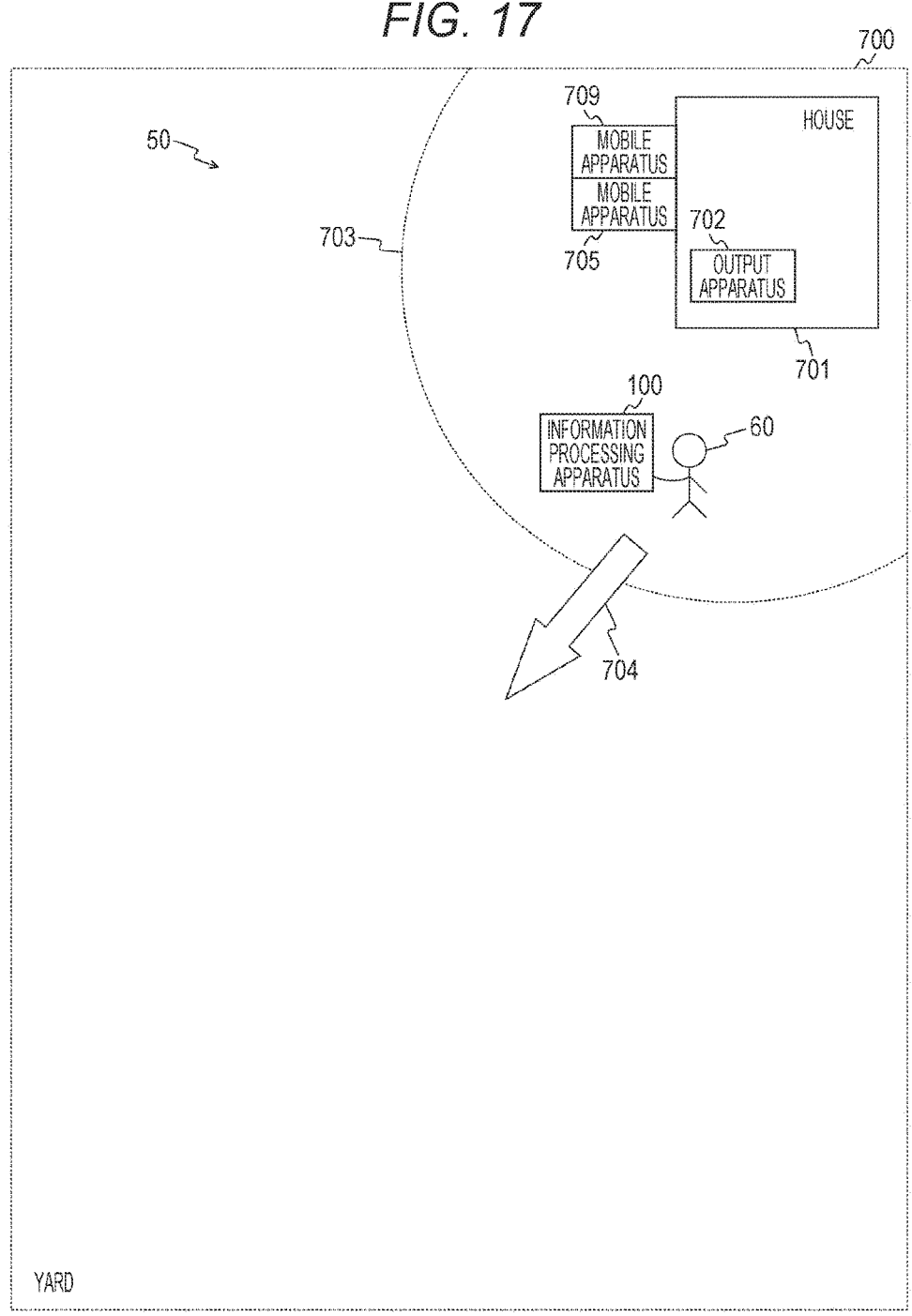
FIG. 17 is a diagram that illustrates an example of the system configuration of a communication system 50 according to a second embodiment of the present technology.
Figure 18:
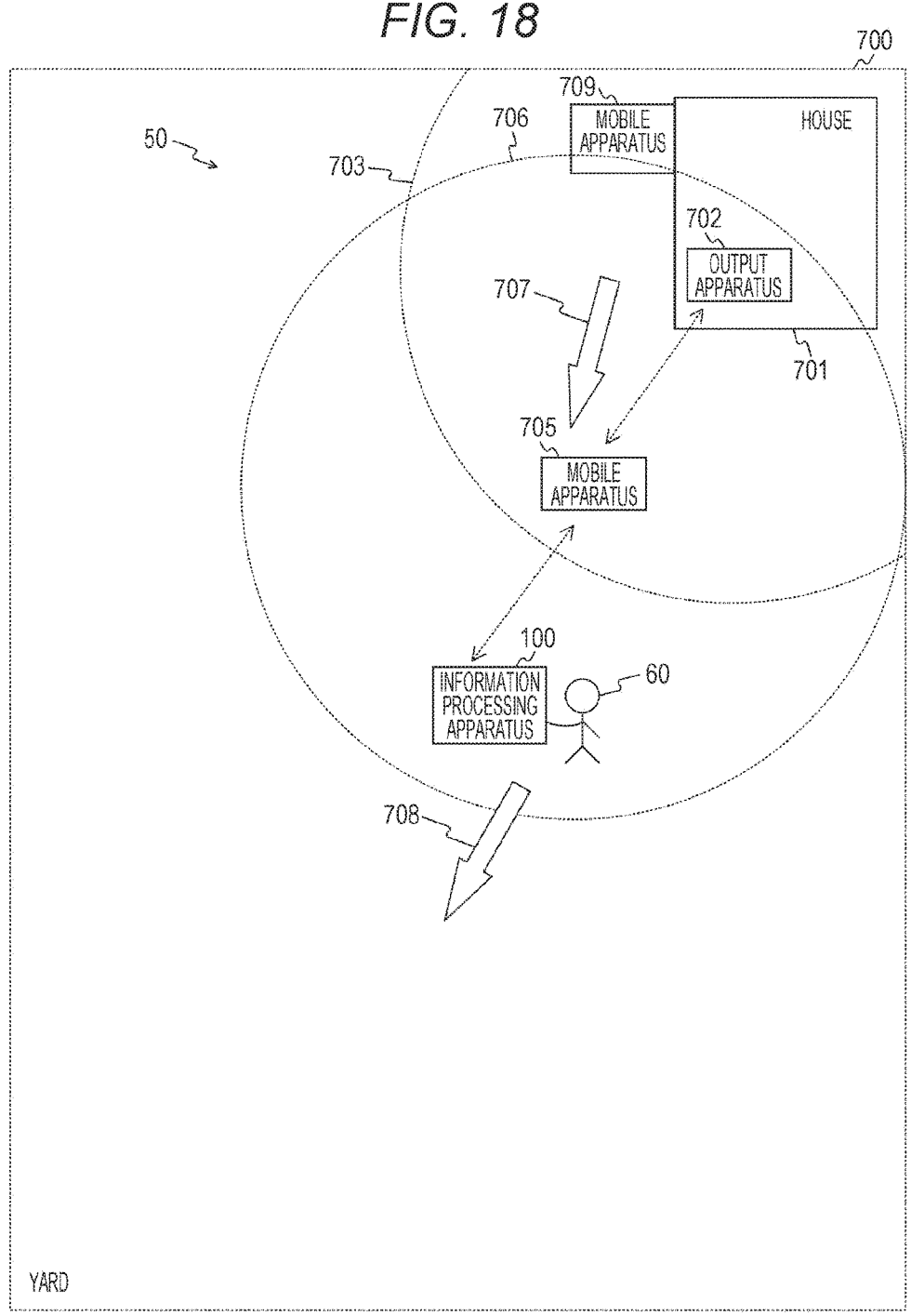
FIG. 18 is a diagram that illustrates an example of the system configuration of a communication system 50 according to a second embodiment of the present technology.
Figure 19:
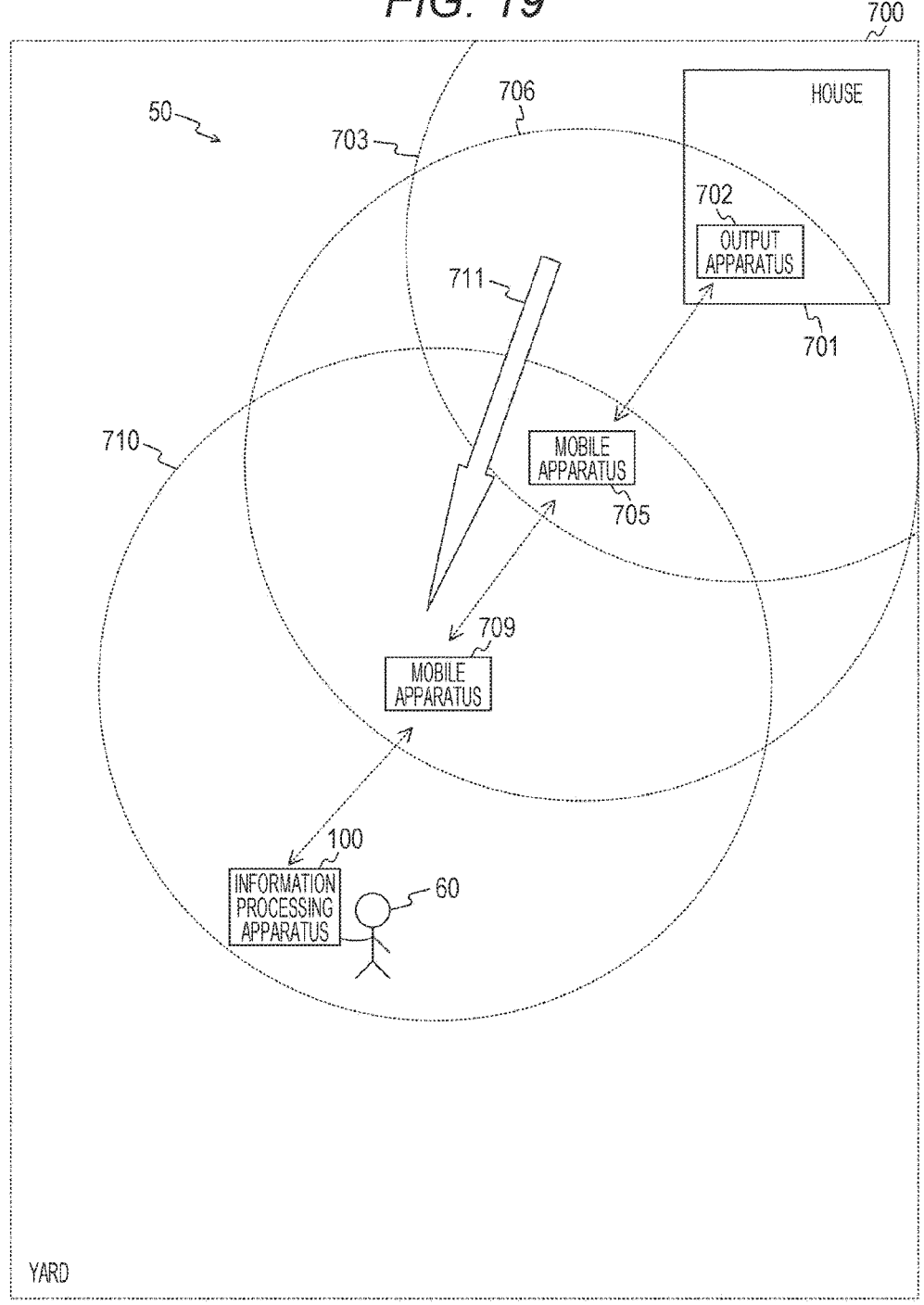
FIG. 19 is a diagram that illustrates an example of the system configuration of a communication system 50 according to a second embodiment of the present technology.

FIGS. 17 to 19 are diagrams that illustrate an example of the system configuration of a communication system 50 according to the second embodiment of the present technology.

Figure 20:
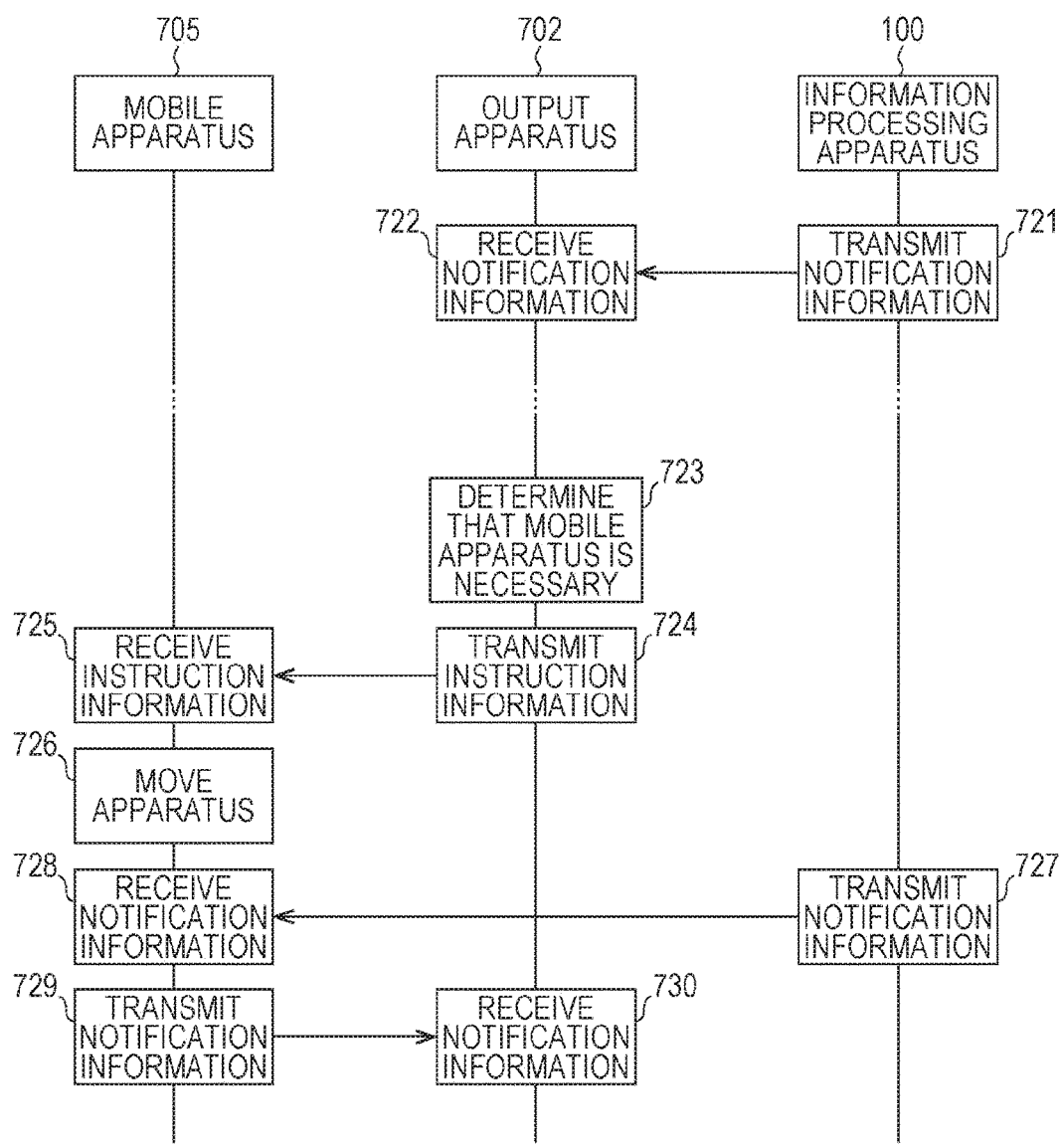
FIG. 20 is a sequence diagram that illustrates an example of a communication process between apparatuses configuring the communication system 50 according to the second embodiment of the present technology.
Figure 21:
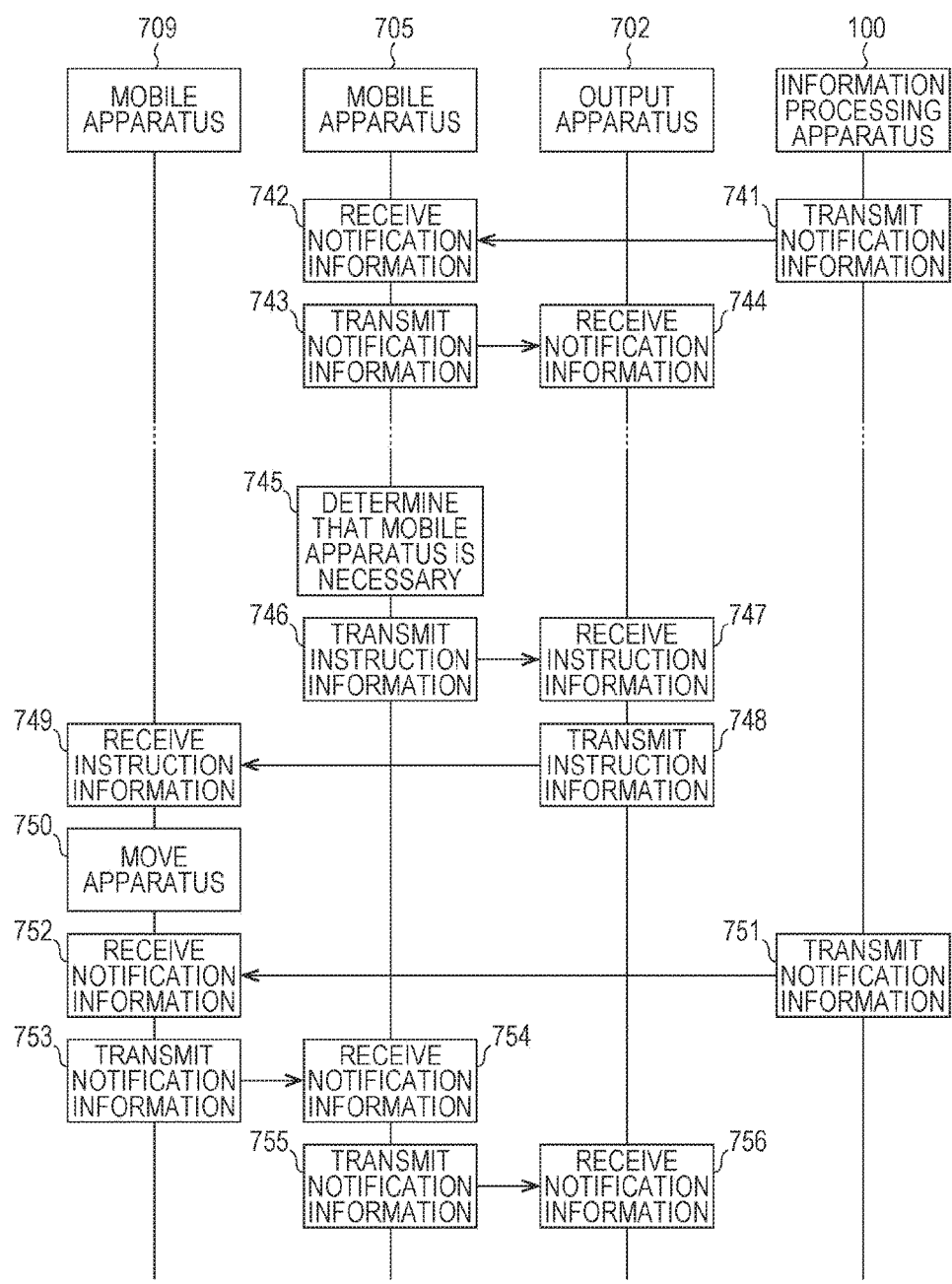
FIG. 21 is a sequence diagram that illustrates an example of a communication process between apparatuses configuring the communication system 50 according to the second embodiment of the present technology.

FIGS. 20 and 21 are sequence diagrams that illustrate an example of a communication process between apparatuses configuring the communication system 50 according to the second embodiment of the present technology.

FIGS. 17 to 19 illustrate an example of a house 701 having a large outdoor yard 700 of which the network area is not covered by an apparatus (for example, the output apparatus 702) arranged in the house 701. In FIGS. 17 to 19, for the convenience of description, only the output apparatus 702 is representatively illustrated as an apparatus arranged in the house 701. Here, a range in which electric waves of the output apparatus 702 arrive is schematically illustrated using a circle (range 703) of a dotted line. In addition, the yard 700 is schematically illustrated using a rectangle of dotted lines.

In addition, as apparatuses that are movable in the air (three-dimensional space), a mobile apparatus 705 and a mobile apparatus 709 are illustrated. The mobile apparatus 705 and the mobile apparatus 709 are apparatuses that have a radio communication function and are movable in the air (three-dimensional space). For example, the mobile apparatus 705 is a radio-controlled flying body (for example, an airplane, a helicopter, or a balloon). For example, apparatuses (for example, robots) that are autonomously movable in the air (three-dimensional space) may be used as the mobile apparatus 705 and the mobile apparatus 709. In addition, for example, as the mobile apparatus 705 and the mobile apparatus 709, apparatuses (for example, a radio-controlled car or an automatic cleaning robot) that are autonomously movable on the ground (two-dimensional space) may be used.

Here, description will be presented with reference to FIG. 20. As illustrated in FIG. 17, for example, a case will be considered in which a child user 60 comes out from the house 701 and plays in the yard 700. An apparatus (node) that can generate a mesh network is assumed not to be installed in the yard 700. In addition, an apparatus closest to the child user 60 is assumed to be an output apparatus 702. In such a case, for example, while the child user 60 plays within a range 703 in which electric waves of the output apparatus 702 arrive, the output apparatus 702 can receive notification information transmitted from the information processing apparatus 100 (721 and 722). The notification information may include positional information of the information processing apparatus 100. In addition, the output apparatus 702 sequentially measures the received signal strength of the notification information transmitted from the information processing apparatus 100. Here, as the received signal strength, for example, a received signal strength indication (RSSI) may be used.

Here, for example, when the user 60 moves in a direction (a direction denoted by arrow 704) opposite to the direction toward the house 701 and goes far from the house 701, the received signal strength of the notification information received by the output apparatus 702 is weakened in accordance with a distance from the house 701. Thus, a control unit (corresponding to the control unit 230 illustrated in FIG. 4) of the output apparatus 702 compares the measured received signal strength with a threshold that has been set. Then, in a case where the measured reception signal strength is of a level less than the threshold, the control unit of the output apparatus 702 determines that a connection between the information processing apparatus 100 and the output apparatus 702 is to be cut out. In other words, the control unit of the output apparatus 702 determines that a connection between the information processing apparatus 100 and a network configured by apparatuses arranged at the house 701 is to be cut out. In such a case, the control unit of the output apparatus 702 determines that a repeater (relay node) is necessary before the connection between the information processing apparatus 100 and the network configured by apparatuses arranged at the house 701 is cut out (723). In other words, as the user 60 goes far, there is a possibility of disengagement from the network, and accordingly, it is determined that a repeater needs to be arranged. The control unit of the output apparatus 702 may determine that a repeater (relay node) is necessary based on the positional information of the information processing apparatus 100 included in the notification information transmitted from the information processing apparatus 100 (721 and 722). In the example illustrated in FIG. 20, an example in which the mobile apparatus 705 is used as the repeater is illustrated.

In addition, this example illustrates an example in which the output apparatus 702 determines whether or not a repeater is arranged. However, a case may be considered in which the output apparatus 702 does not have such a processing capability. Thus, an information processing apparatus (for example, the information processing apparatus 200 illustrated in FIG. 1) having a high-level processing capability or the mobile apparatuses 705 and 709 may be configured to make such a determination.

For example, the output apparatus 702 observes the RSSI of the notification information transmitted from the information processing apparatus 100 and transmits a value of the measurement result to an information processing apparatus (for example, the information processing apparatus 200 illustrated in FIG. 1 or the mobile apparatuses 705 and 709). In such a case, the information processing apparatus monitors the value of the measurement result (compares the value of the measurement result with a set threshold) and makes the determination described above. Further, for example, an information processing apparatus (for example, the information processing apparatus 200 illustrated in FIG. 1 or the mobile apparatuses 705 and 709) may determine that a repeater (relay node) is arranged based on the positional information of the information processing apparatus 100 and the output apparatus 702.

In this way, in a case where a mobile apparatus (repeater) is determined to be necessary (723), the control unit of the output apparatus 702 transmits instruction information used for moving the mobile apparatus 705 to the mobile apparatus 705 (724 and 725). Here, the instruction information is transmitted with a movement instruction used for expanding the area and movement information used for moving the mobile apparatus 705 to a position for relaying the information processing apparatus 100 and the output apparatus 702 being included therein.

This movement information, for example, includes positional information used for specifying a position between the information processing apparatus 100 and the output apparatus 702. In addition, the movement information includes direction information and distance information specifying a position based on the direction of the position and a distance up to the position, positional information specifying the positions of the information processing apparatus 100 and the output apparatus 702, and the like.

In a case where instruction information is received (725), a control unit (corresponding to the control unit 230 illustrated in FIG. 4) of the mobile apparatus 705 executes control for moving the mobile apparatus 705 based on the positional information included in the received instruction information (726). For example, the mobile apparatus 705 moves the apparatus so as to face a center position on a straight line joining the information processing apparatus 100 and the output apparatus 702 (a direction denoted by arrow 707 illustrated in FIG. 18).

Then, in a case where the notification information transmitted from the information processing apparatus 100 is received (727 and 728), the mobile apparatus 705 transmits the notification information to the output apparatus 702 (729 and 730).

In addition, for example, after moving the mobile apparatus 705 based on the positional information included in the received instruction information, the control unit of the mobile apparatus 705 can autonomously adjust the position so as to be a repeater of the information processing apparatus 100 (the user 60) and the output apparatus 702. For example, the control unit of the mobile apparatus 705 observes the received signal strengths of the information processing apparatus 100 and the output apparatus 702 while moving the surroundings. Then, the control unit of the mobile apparatus 705 detects a position at which the received signal strengths of the information processing apparatus 100 and the output apparatus 702 are approximately in the same level and executes control so as to stay at the position. This adjustment process may be executed regularly or irregularly. In addition, at timing at which a difference between the received signal strengths of the information processing apparatus 100 and the output apparatus 702 is a threshold or more, the adjustment process may be executed.

In this way, also in a case where the user 60 possessing the information processing apparatus 100 moves to the outside of the range 703 in which the electric waves of the output apparatus 702 arrive, the mobile apparatus 705 can be moved to serve as a repeater. Accordingly, the user 60 possessing the information processing apparatus 100 is within the range 706 in which the electric waves of the mobile apparatus 705 arrive, and thus, the information processing apparatus 100 can be prevented from being disengaged from the network.

In this way, also in a case where there is a limit on the network area configured by apparatuses installed at the house 701, by using the mobile apparatus 705, the network area can be expanded. Here, in the example illustrated in FIG. 18, a case may be also considered in which the user 60 possessing the information processing apparatus 100 further moves in the direction denoted by arrow 708. In such a case, there is also a case where information transmitted from the information processing apparatus 100 is not receivable for the mobile apparatus 705 even when the position of the mobile apparatus 705 is moved. Thus, by using the mobile apparatus 709 as a repeater, the area can be further expanded. In other words, the three-hop-only area can be expanded.

Here, description will be presented with reference to FIG. 21. For example, notification information can be exchanged between the information processing apparatus 100 and the output apparatus 702 by using the mobile apparatus 705 as a repeater (741 to 744). However, as illustrated in FIG. 18, in a case where the user 60 moves in the direction denoted by arrow 708 and goes farther from the house 701, the role of the repeater is not achievable for the mobile apparatus 705. For this reason, the mobile apparatus 705, similarly to the determination process described above, determines that an additional repeater is necessary (745).

In this way, in a case where it is determined that an additional mobile apparatus (repeater) is necessary (745), the control unit of the mobile apparatus 705 transmits instruction information used for moving the mobile apparatus 709 to the mobile apparatus 709 through the output apparatus 702 (746 to 749).

In a case where the instruction information has been received (749), a control unit (corresponding to the control unit 230 illustrated in FIG. 4) of the mobile apparatus 709 executes control for moving the mobile apparatus 709 based on the movement information included in the received instruction information (750). For example, the mobile apparatus 709 moves the apparatus so as to face a center position on a straight line joining the information processing apparatus 100 and the mobile apparatus 705 (a direction denoted by arrow 711 illustrated in FIG. 19).

Then, in a case where the notification information transmitted from the information processing apparatus 100 is received (751 and 752), the mobile apparatus 709 transmits the notification information to the output apparatus 702 through the mobile apparatus 705 (753 to 756).

In addition, for example, after moving the mobile apparatus 709 based on the positional information included in the received instruction information, the control unit of the mobile apparatus 709 can autonomously adjust the position so as to be a repeater of the information processing apparatus 100 (the user 60) and the mobile apparatus 705.

In this way, by using the two mobile apparatuses 705 and 709 as repeaters, the network area can be further expanded. In addition, in this example, while an example in which the network area is expanded up to three hops has been illustrated, the network area may be expanded up to four hops or more.

In addition, the control unit of the mobile apparatus 709 may be configured to transmit the value of the received signal strength of the information processing apparatus 100 to an information processing apparatus (for example, the information processing apparatus 200 illustrated in FIG. 1) executing a context analysis regularly or irregularly. Similarly, for example, the control unit of the mobile apparatus 705 may be configured to transmit the values of the received signal strengths of the mobile apparatus 709 and the output apparatus 702 to the information processing apparatus executing a context analysis regularly or irregularly.

Furthermore, for example, each apparatus (including the output apparatus 702) disposed inside the house 701 that can receive a signal transmitted from the mobile apparatus 705 may be configured to transmit the received signal strength of the mobile apparatus 705, which is measured by the apparatus, to the information processing apparatus executing a context analysis regularly or irregularly.

In this way, by transmitting one or a plurality of received signal strengths to the information processing apparatus executing a context analysis, the information processing apparatus can analyze a direction in which the information processing apparatus 100 travels. Then, the information processing apparatus can determine whether a repeater needs to be further increased based on a result of the analysis. In addition, the information processing apparatus can start up the operation of an additional repeater based on a result of the determination and notify a direction in which the started-up repeater is to be moved and the amount of the movement.

Here, a case may be also considered in which the user 60 returns in a direction toward the house 701. In such a case, in the mobile apparatus 709, there are cases where the received signal strength from the information processing apparatus 100 increases. In addition, there are also cases where the mobile apparatus 705 can receive a signal transmitted from the information processing apparatus 100.

For this reason, for example, in a case where three or more repeaters are arranged, at timing at which at least two of a plurality of the repeaters are in the state of capable of receiving a signal transmitted from the information processing apparatus 100, a relay process executed by at least one repeater is stopped so as to be returned to the previous process.

In addition, there is a possibility that the user 60 returns in the direction toward the house 701 and goes far again. For this reason, it is preferable that a condition for stopping the relay process executed by the relay function of at least one of the plurality of the repeaters and returning the process is set. For example, a case where three or more repeaters can receive a signal transmitted from the information processing apparatus 100 or a case where a signal transmitted from the information processing apparatus 100 can be received from any one of the plurality of apparatuses installed inside the house 701 may be set as the returning condition.

In this way, the control unit of the output apparatus 702 can determine the position of the repeater (mobile apparatus 705) used for communication between the information processing apparatus 100 and the output apparatus 702 based on a relative positional relation between the information processing apparatus 100 and the output apparatus 702. In such a case, the control unit of the output apparatus 702 can make the determination at timing before a distance between the information processing apparatus 100 and the output apparatus 702 becomes a distance at which the information processing apparatus 100 and the output apparatus 702 are not directly communicable. Similarly, the control unit of the mobile apparatus 705 can determine the position of the repeater (mobile apparatus 709) used for communication between the information processing apparatus 100 and the mobile apparatus 705 based on a relative positional relation between the information processing apparatus 100 and the mobile apparatus 705. In addition, the timing for the determination may be similarly set.

In addition, such control units execute control for moving the repeaters (the mobile apparatuses 705 and 709) up to the determined positions. For example, the repeater can be moved in the air so as to be moved up to the determined position.

3. Application Example

The technology according to an embodiment of the present disclosure is applicable to various products. For example, each of the apparatuses configuring the communication systems 10, 30, 40, and 50 may be realized as a mobile terminal such as a smartphone, a tablet personal computer (PC), a notebook PC, a mobile gaming terminal, or a digital camera, a fixed terminal such as a television set, a printer, a digital scanner, or a network storage, or an in-vehicle terminal such as a car navigation apparatus. In addition, each of the apparatuses configuring the communication systems 10, 30, 40, and 50 may be realized as a terminal (also referred to as a machine type communication (MTC) terminal) that executes machine to machine (M2M) communication such as a smart meter, an automatic vending machine, a remote monitoring apparatus or a point of sale (POS) terminal. Furthermore, each of the apparatuses configuring the communication systems 10, 30, 40, and 50 may be a radio communication module (for example, an integrated circuit module configured by one die) mounted on each of the terminals.

3-1. First Application Example

Figure 22:
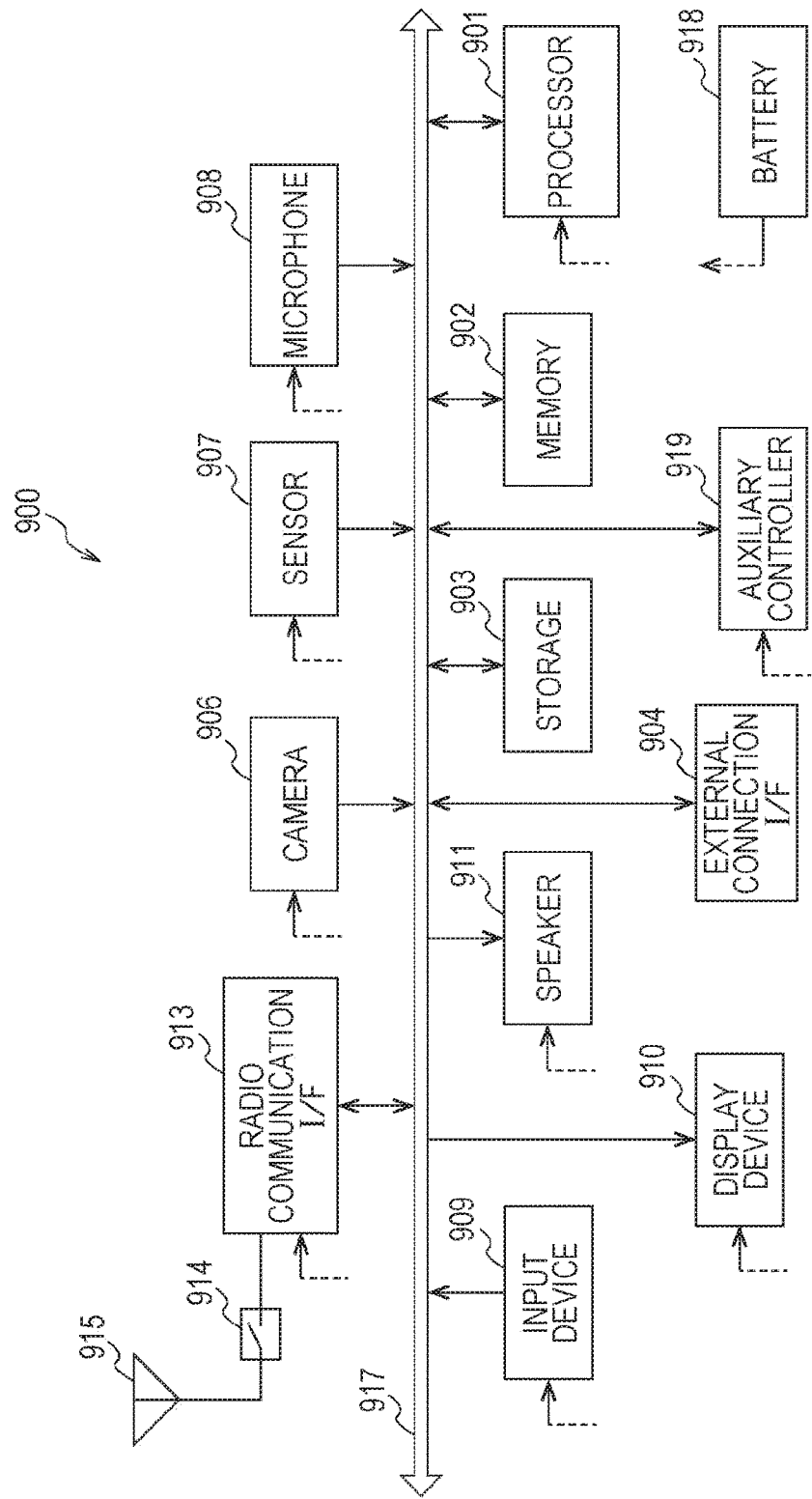
FIG. 22 is a block diagram that illustrates an example of the schematic configuration of a smartphone.

FIG. 22 is a block diagram that illustrates an example of the schematic configuration of a smartphone 900 to which the technology relating to the present disclosure is applied. The smartphone 900 includes: a processor 901; a memory 902; a storage 903; an external connection interface 904; a camera 906; a sensor 907; a microphone 908; an input device 909; a display device 910; a speaker 911; a radio communication interface 913; an antenna switch 914; an antenna 915; a bus 917; a battery 918; and an auxiliary controller 919.

The processor 901, for example, may be a central processing unit (CPU) or a system on chip (SoC) and controls the functions of an application layer and the other layers of the smartphone 900. The memory 902 includes a random access memory (RAM) and a read only memory (ROM) and stores programs executed by the processor 901 and data. The storage 903 may include a storage medium such as a semiconductor memory or a hard disk. The external connection interface 904 is an interface that is used for connecting an externally-attached device such as a memory card or a universal serial bus (USB) device to the smartphone 900.

The camera 906, for example, includes imaging devices such as charge coupled devices (CCD) or complementary metal oxide semiconductors (CMOS) and generates a captured image. The sensor 907, for example, may include a sensor group of a positioning sensor, a gyro sensor, a geomagnetic sensor, an acceleration sensor, and the like. The microphone 908 converts speech input to the smartphone 900 into an audio signal. The input device 909, for example, includes a touch sensor detecting a touch on a screen of the display device 910, a keypad, a keyboard, a button, a switch, or the like and receives an operation or an information input from the user.

The display device 910 includes a screen of a liquid crystal display (LCD), an organic light emitting diode (OLED) display, or the like and displays an output image of the smartphone 900. The speaker 911 converts an audio signal output from the smartphone 900 into speech.

The radio communication interface 913 supports one or more wireless LAN standards such as IEEE802.11a, 11b, 11g, 11n, 11ac, and 11ad and executes radio communication. The radio communication interface 913 can communicate with the other apparatuses through a wireless LAN access point in an infrastructure mode. In addition, in a direct communication mode such as an ad hoc mode or a Wi-Fi direct mode, the radio communication interface 913 can directly communicate with other apparatuses. In the Wi-Fi Direct mode, while one of two terminals operates as an access point, differently from the ad hoc mode, the communication process is directly executed between the terminals. The radio communication interface 913, typically, may include; a baseband processor; a radio frequency (RF) circuit, a power amplifier, and the like. The radio communication interface 913 may be a one-chip module in which a memory storing a communication control program, a processor executing the program, and related circuits are integrated. The radio communication interface 913 may support a radio communication system of a different type such as a near field radio communication system, a proximity wireless communication system, or a cellular communication system in addition to the wireless LAN system. The antenna switch 914 switches a connection destination of the antenna 915 among a plurality of circuits (for example, circuits for mutually-different radio communication systems) included in the radio communication interface 913. The antenna 915 includes one or a plurality of antenna devices (for example, a plurality of antenna devices configuring a MIMO antenna) and is used for transmitting and receiving a radio signal through the radio communication interface 913.

In addition, the smartphone 900 is not limited to the example illustrated in FIG. 22 but may include a plurality of antennas (for example, an antenna used for wireless LAN, an antenna used for the proximity wireless communication system, and the like). In such a case, the antenna switch 914 may be omitted from the configuration of the smartphone 900.

The bus 917 interconnects: the processor 901; the memory 902; the storage 903; the external connection interface 904; the camera 906; the sensor 907; the microphone 908; the input device 909; the display device 910; the speaker 911; the radio communication interface 913; and the auxiliary controller 919. The battery 918 supplies power to each block of the smartphone 900 illustrated in FIG. 22 through a feed line that is partially illustrated using a broken line in the figure. The auxiliary controller 919, for example, in a sleep mode, operates minimum necessary functions of the smartphone 900.

In the smartphone 900 illustrated in FIG. 22, the control unit 130 described with reference to FIG. 2 and the control unit 230 described with reference to FIG. 4 may be mounted in the radio communication interface 913. In addition, at least some of the functions may be mounted in the processor 901 or the auxiliary controller 919.

In addition, the smartphone 900 may operate as a radio access point (software AP) as the processor 901 executes an access point function in an application level. Furthermore, the radio communication interface 913 may have the radio access point function.

3-2. Second Application Example

Figure 23:
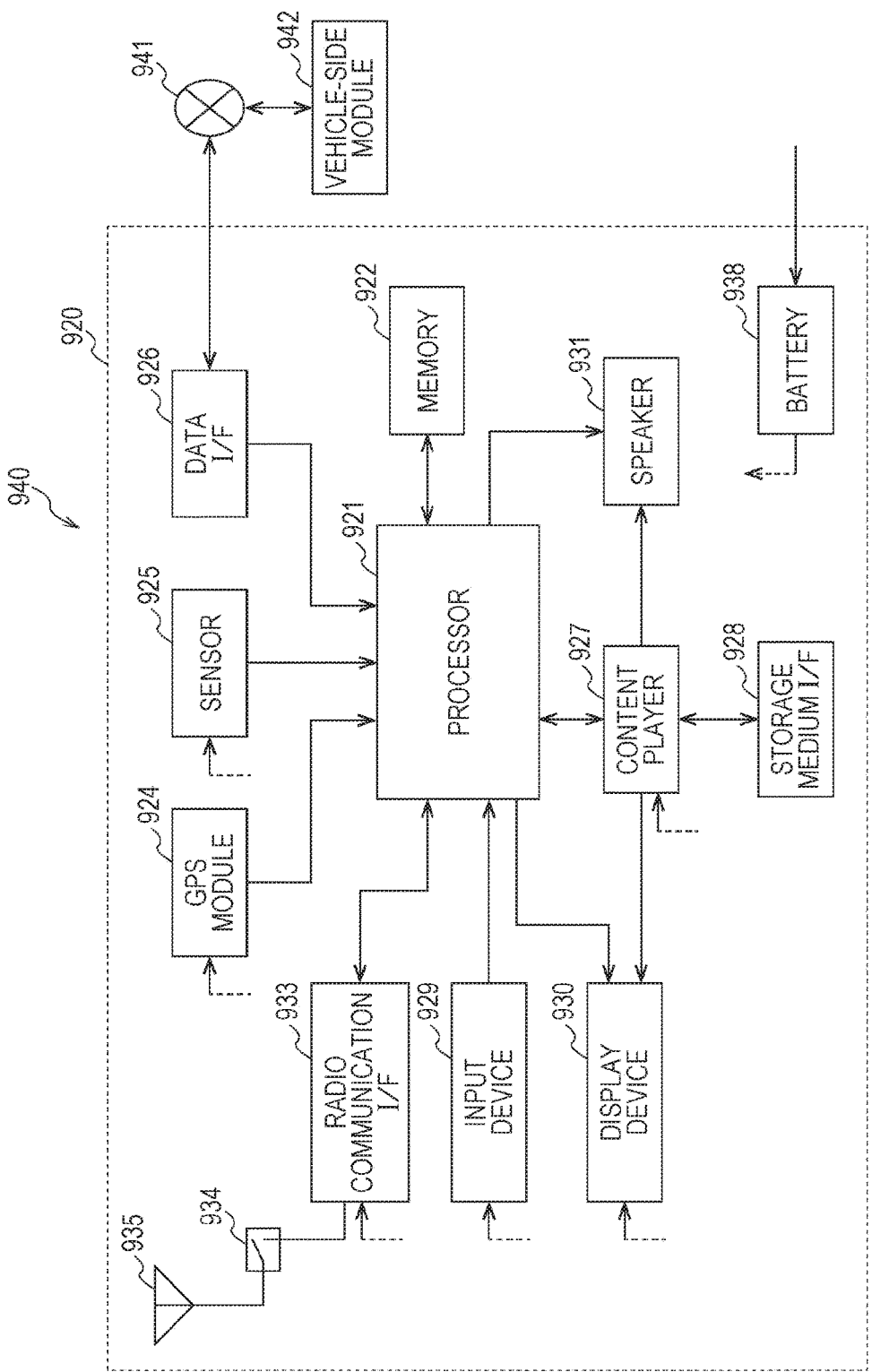
FIG. 23 is a block diagram that illustrates an example of the schematic configuration of a car navigation apparatus.

FIG. 23 is a block diagram that illustrates an example of the schematic configuration of a car navigation apparatus 920 to which the technology relating to the present disclosure is applied. The car navigation apparatus 920 includes: a processor 921; a memory 922; a global positioning system (GPS) module 924; a sensor 925; a data interface 926; a content player 927; a storage medium interface 928; an input device 929; a display device 930; a speaker 931; a radio communication interface 933; an antenna switch 934; an antenna 935; and a battery 938.

The processor 921, for example, is a CPU or a SoC and controls the navigation function and the other functions of the car navigation apparatus 920. The memory 922 includes a RAM and a ROM and stores programs executed by the processor 921 and data.

The GPS module 924 measures the position (for example, the longitude, the latitude, and the altitude) of the car navigation apparatus 920 by using GPS signals received from GPS satellites. The sensor 925, for example, may include a sensor group of a gyro sensor, a geo magnetic sensor, an atmosphere pressure sensor, and the like. The data interface 926, for example, is connected to an in-vehicle network 941 through a terminal not illustrated in the figure and acquires data such as vehicle speed data that is generated on the vehicle side.

The content player 927 reproduces a content stored on a storage medium (for example, a CD or a DVD) inserted in the storage medium interface 928. The input device 929, for example, includes a touch sensor detecting a touch on the screen of the display device 930, a button, a switch, or the like and receives an operation or an information input from the user. The display device 930 includes the screen of an LCD, an OLED display, or the like and displays an image of the navigation function or a reproduced content. The speaker 931 outputs an audio of the navigation function or the reproduced content.

The radio communication interface 933 supports one or more wireless LAN standards such as IEEE802.11a, 11b, 11g, 11n, 11ac, and 11ad and executes radio communication. The radio communication interface 933 can communicate with the other apparatuses through a wireless LAN access point in an infrastructure mode. In addition, in a direct communication mode such as an ad hoc mode or a Wi-Fi direct mode, the radio communication interface 933 can directly communicate with other apparatuses. The radio communication interface 933, typically, may include; a baseband processor; an RF circuit, a power amplifier, and the like. The radio communication interface 933 may be a one-chip module in which a memory storing a communication control program, a processor executing the program, and related circuits are integrated. The radio communication interface 933 may support a radio communication system of a different type such as a near field radio communication system, a proximity wireless communication system, or a cellular communication system in addition to the wireless LAN system. The antenna switch 934 switches a connection destination among a plurality of circuits included in the radio communication interface 933. The antenna 935 includes one or a plurality of antenna devices and is used for transmitting and receiving a radio signal through the radio communication interface 933.

In addition, the car navigation apparatus 920 is not limited to the example illustrated in FIG. 23 but may include a plurality of antennas. In such a case, the antenna switch 934 may be omitted from the configuration of the car navigation apparatus 920.

The battery 938 supplies power to each block of the car navigation apparatus 920 illustrated in FIG. 23 through a feed line that is partially illustrated using a broken line in the figure. The battery 938 accumulates power supplied from the vehicle side.

In the car navigation apparatus 920 illustrated in FIG. 23, the control unit 130 described with reference to FIG. 2 and the control unit 230 described with reference to FIG. 4 may be mounted in the radio communication interface 933. In addition, at least some of the functions may be mounted in the processor 921.

In addition, the technology relating to the present disclosure may be realized as an in-vehicle system (or a vehicle) 940 that includes one or more blocks of the car navigation apparatus 920 described above, the in-vehicle network 941, and a vehicle-side module 942. The vehicle-side module 942 generates vehicle-side data such as vehicle speed, engine revolution speed, or malfunction information and outputs the generated data to the in-vehicle network 941.

The embodiment described above illustrates an example for implementing the present technology, and an item of the embodiment and a specified item of claims have a correspondence relation. Similarly, a specified item of the claims and an item of the embodiment of the present technology, to which the same name is assigned, have a correspondence relation. However, the present technology is not limited to the embodiment but may be realized by applying various changes to the embodiment in a range not departing from the concept thereof.

In addition, the processing sequence described in the above-described embodiment may be perceived as a method having such a series of the sequence and may be perceived as a program causing a computer to execute such a series of the sequence or a recording medium storing the program. As the recording medium, for example, a compact disc (CD), a MiniDisc (MD), a digital versatile disc (DVD), a memory card, a Blu-ray (registered trademark) disc, or the like can be used.

The advantages described here are merely examples, and the advantages are not limited thereto, but other advantages may be acquired.

The present technology may take the following configurations as well.

(1) An information processing device comprising:
circuitry configured to:
receive a signal from a first device;
measure a signal strength of the signal received from the first device;
determine whether the signal strength is less than a threshold; and
in a case that the signal strength is determined to be less than the predetermined threshold, transmit to an second device an instruction signal such that, in response to the instruction signal, the second device moves to a position to relay the signal from the first device to the information processing device.

(2) The information processing device according to (1), wherein the position is between the information processing device and the first device.
(3) The information processing device according to (1), wherein
the position is a center position on a straight line connecting first device and the information processing device.
(4) The information processing device according to (1), wherein
the instruction signal includes movement information; and
in response to the instruction signal, the second device is configured to move to the position based on the movement information.
(5) The information processing device according to (4), wherein
the movement information includes at least one of positional information of the position, positional information of the information processing device and the first device, and direction and distance information specifying the position.
(6) The information processing device according to (1), wherein
in response to the instruction signal, the second device is configured to autonomously adjust the position such that the second device can relay the signal from the first device to the information processing device.
(7) The information processing device according to (6), wherein
the second device is configured to autonomously adjust the position regularly or irregularly.
(8) The information processing device according to (6), wherein
in response to the instruction signal, the second device is configured to measure a first signal strength between the information processing device and the second device and a second signal strength between the first device and the second device, and autonomously adjust the position such that the first signal strength and the second signal strength are approximately equal.
(9) The information processing device according to (8), wherein
the second device is configured to autonomously adjust the position in a case that a difference between the first signal strength and the second signal strength is greater than or equal to a second threshold.
(10) The information processing device according to (1), wherein
the circuitry is configured to transmit to the second device the instruction signal based on positional information of the first device.
(11) The information processing device according to (10), wherein
the circuitry is configured to receive the positional information from the first device.
(12) The information processing device according to (1), wherein
the second device is configured to move in air or on ground to the position.
(13) The information processing device according to (1), wherein
in a case that the it is determined that, in addition to the second device, a third device is necessary to relay the signal from the first device to the information processing device, the circuitry is configured to transmit to the third device a second instruction signal such that, in response to the second instruction signal, the third device moves to a position to relay, together with the second device, the signal from the first device to the information processing device.
(14) The information processing device according to (13), wherein
the second device is configured to determine whether the third device is necessary to relay the signal from the first device to the information processing device,
in a case that the second device determines the third device is necessary to relay the signal from the first device to the information processing device, the second device is configured to transmit to the information processing device a third instruction signal, and
in response to the third instruction signal, the circuitry is configured to transmit to the third device the second instruction signal.
(15) An information processing method comprising:
receiving a signal from a first device;
measuring a signal strength of the signal received from the first device;
determining, using circuitry, whether the signal strength is less than a threshold; and
in a case that the signal strength is determined to be less than the predetermined threshold, transmitting to an second device an instruction signal such that, in response to the instruction signal, the second device moves to a position to relay the signal from the first device to the information processing device.
(16) An information processing device comprising:
circuitry configured to:
receive location information of a first device from the first device;
receive location information of a second device from the second device;
determine whether the information processing device is necessary to relay a signal from the first device to the second device based on the location information of the first device and the location information of the second device; and
in a case that the information processing device determines the information processing device is necessary to relay the signal from the first device to the second device, control the information processing device to move to a position to relay the signal from the first device to the second device.
(17) The information processing device according to (16), wherein
the circuitry is configured to autonomously adjust the position such that the information processing device can relay the signal from the first device to the second device.
(18) The information processing device according to (17), wherein
the circuitry is configured to autonomously adjust the position regularly or irregularly.
(19) The information processing device according to (17), wherein
the circuitry is configured to:
measure a first signal strength between the information processing device and the first device and a second signal strength between the information processing device and the second device; and
control the information processing device to autonomously adjust the position such that the first signal strength and the second signal strength are approximately equal.

(20) The information processing device according to (19), wherein
the circuitry is configured to autonomously adjust the position in a case that a difference between the first signal strength and the second signal strength is greater than or equal to a threshold.

REFERENCE SIGNS LIST 10, 30, 40, 50 Communication system
11 Network
100 Information processing apparatus
110 First radio communication unit
111 Antenna
120 Second radio communication unit
121 Antenna
130 Control unit
140 Storage unit
150 Bus
200 Information processing apparatus
210 First radio communication unit
211 Antenna
220 Second radio communication unit
221 Antenna
230 Control unit
240 Storage unit
250 Processing unit
260 Bus
301 Detection apparatus
302 Input apparatus
303 Output apparatus
304 Power apparatus
305 Output apparatus
310 Communication apparatus
311 Input apparatus
312 Output apparatus
313 Input apparatus
314 Storage apparatus
315 Output apparatus
316 Processing apparatus
317 Output apparatus
318 Power apparatus
319 Output apparatus
320 Information processing apparatus
501 Sensor
502 Light
503 TV set
504 Gaming machine
505, 506 Sensor
600 Information processing apparatus
611 to 621 Sensor
601 to 609 Speaker
631 to 637 Microphone
640 Information processing apparatus
702 Output apparatus
705 Mobile apparatus
709 Mobile apparatus
900 Smartphone
901 Processor
902 Memory
903 Storage
904 External connection interface
906 Camera
907 Sensor
908 Microphone
909 Input device
910 Display device
911 Speaker
913 Radio communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Content player
928 Storage medium interface
929 Input device
930 Display device
931 Speaker
933 Radio communication interface
934 Antenna switch
935 Antenna
938 Battery
941 In-vehicle network
942 Vehicle-side module

The invention claimed is:

1. An information processing device, comprising:
circuitry configured to:
receive a first signal from a first device;
measure a first signal strength of the first signal received from the first device;
determine whether the first signal strength is less than a first threshold; and
based on the determination that the first signal strength is less than the first threshold, transmit a first instruction signal to a second device,
wherein the first instruction signal causes the second device to move to a first position to relay a second signal from the first device to the information processing device, and
wherein, at the first position, a second signal strength between the information processing device and the second device is equal to a third signal strength between the first device and the second device.

2. The information processing device according to claim 1, wherein
the first position is between the information processing device and the first device.

3. The information processing device according to claim 1, wherein
the first position is a center position on a straight line that connects the first device and the information processing device.

4. The information processing device according to claim 1, wherein
the first instruction signal includes movement information, and
the first instruction signal further causes the second device to move to the first position based on the movement information.

5. The information processing device according to claim 4, wherein
the movement information includes at least one of first positional information of the first position, second positional information of the information processing device, third positional information of the first device, or direction and distance information specifying the first position.

6. The information processing device according to claim 1, wherein
the first instruction signal further causes the second device to autonomously adjust a location of the second device relative to the first position to relay the second signal from the first device to the information processing device.

7. The information processing device according to claim 6, wherein
the first instruction signal further causes the second device to autonomously adjust the location regularly or irregularly.

8. The information processing device according to claim 6, wherein
the first instruction signal further causes the second device to measure the second signal strength between the information processing device and the second device, and measure the third signal strength between the first device and the second device.

9. The information processing device according to claim 6, wherein
the first instruction signal further causes the second device to autonomously adjust the location based on a difference between the second signal strength and the third signal strength that is greater than or equal to a second threshold.

10. The information processing device according to claim 1, wherein
the circuitry is further configured to transmit the first instruction signal to the second device based on positional information of the first device.

11. The information processing device according to claim 10, wherein
the circuitry is further configured to receive the positional information from the first device.

12. The information processing device according to claim 1, wherein
the first instruction signal further causes the second device to move in air or on ground to the first position.

13. The information processing device according to claim 1, wherein
the circuitry is further configured to:
determine that, in addition to the second device, a third device is necessary to relay a third signal from the first device to the information processing device; and
transmit a second instruction signal to a third device, wherein the second instruction signal causes the third device to move to a second position to relay, together with the second device, the third signal from the first device to the information processing device.

14. The information processing device according to claim 1, wherein
the second device determines that, in addition to the second device, a third device is necessary to relay a third signal from the first device to the information processing device,
based on the determination that the third device is necessary, the second device transmits a third instruction signal to the information processing device, and
the circuitry is further configured to transmit a fourth instruction signal to the third device based on the third instruction signal.

15. An information processing method, comprising:
in an information processing device:
receiving a first signal from a first device;
measuring a first signal strength of the first signal received from the first device;
determining, using circuitry, whether the first signal strength is less than a threshold; and
based on the determination that the first signal strength is less than the threshold, transmitting an instruction signal to a second device,
wherein the instruction signal causes the second device to move to a position to relay second signal from the first device to the information processing device, and
wherein, at the position, a second signal strength between the information processing device and the second device is equal to a third signal strength between the first device and the second device.

16. An information processing device, comprising:
circuitry configured to:
receive first location information of a first device from the first device;
receive second location information of a second device from the second device;
determine that the information processing device is necessary to relay a signal from the first device to the second device,
wherein the determination is based on the first location information of the first device and the second location information of the second device; and
based on the determination that the information processing device is necessary to relay the signal from the first device to the second device, move the information processing device to a position to relay the signal from the first device to the second device,
wherein, at the position, a first signal strength between the information processing device and the first device is equal to a second signal strength between the information processing device and the second device.

17. The information processing device according to claim 16, wherein
the circuitry is further configured to autonomously adjust a location of the information processing device relative to the position to relay the signal from the first device to the second device.

18. The information processing device according to claim 17, wherein
the circuitry is further configured to autonomously adjust the location regularly or irregularly.

19. The information processing device according to claim 17, wherein
the circuitry is further configured to:
measure the first signal strength between the information processing device and the first device;
measure the second signal strength between the information processing device and the second device; and
control the information processing device to autonomously adjust the location.

20. The information processing device according to claim 17, wherein
the circuitry is further configured to autonomously adjust the location based on a difference between the first signal strength and the second signal strength that is greater than or equal to a threshold.

* * * * *